United States Patent
Bamberger et al.

[11] Patent Number: 5,926,259
[45] Date of Patent: *Jul. 20, 1999

[54] LASER RANGE FINDER WITH TARGET QUALITY DISPLAY

[75] Inventors: Stephen J. Bamberger, Lenexa, Kans.; Jeremy G. Dunne, Littleton, Colo.

[73] Assignee: Bushnell Corporation, Overland Park, Kans.

[*] Notice: This patent is subject to a terminal disclaimer.

[21] Appl. No.: 08/821,195

[22] Filed: Mar. 19, 1997

Related U.S. Application Data

[63] Continuation of application No. 08/433,749, May 4, 1995, Pat. No. 5,623,335.

[51] Int. Cl.⁶ .................................................. G01C 3/08
[52] U.S. Cl. ..................... 356/5.01; 356/5.03; 356/4.01
[58] Field of Search .................................... 356/5.01, 5.03

[56] References Cited

U.S. PATENT DOCUMENTS

| | | |
|---|---|---|
| 3,409,368 | 11/1968 | Fernandez . |
| 3,464,770 | 9/1969 | Schmidt . |
| 3,680,958 | 8/1972 | Von Bose . |
| 3,698,811 | 10/1972 | Weil . |
| 3,738,749 | 6/1973 | Everest . |
| 3,752,581 | 8/1973 | Everest . |
| 3,832,056 | 8/1974 | Shipp et al. . |
| 3,852,579 | 12/1974 | Sohn et al. . |
| 3,941,483 | 3/1976 | Ferrin . |
| 4,226,529 | 10/1980 | French . |
| 4,289,397 | 9/1981 | Itzkan et al. . |
| 4,346,989 | 8/1982 | Gort et al. . |
| 4,453,825 | 6/1984 | Buck et al. . |
| 4,527,894 | 7/1985 | Goede et al. . |
| 4,569,599 | 2/1986 | Bolkow et al. . |
| 4,603,973 | 8/1986 | Crow . |
| 4,620,788 | 11/1986 | Giger . |
| 4,699,507 | 10/1987 | Etoh . |
| 4,732,472 | 3/1988 | Konig et al. . |
| 4,787,739 | 11/1988 | Gregory . |
| 4,948,246 | 8/1990 | Shigematsu . |
| 5,291,262 | 3/1994 | Dunne . |
| 5,359,404 | 10/1994 | Dunne . |
| 5,471,215 | 11/1995 | Fukuhara et al. . |
| 5,489,982 | 2/1996 | Gramling et al. ..................... 356/5.05 |
| 5,491,546 | 2/1996 | Wascher et al. . |

Primary Examiner—Stephen C. Buczinski
Attorney, Agent, or Firm—Litman, Kraai and Brown, L.L.C.

[57] ABSTRACT

A laser range finder includes a circular in-sight field of view which incorporates within it a magnified "TV view" of the target area with the TV view roughly approximating the rectangular shape of a standard television picture. Also within the circular field, over and under the TV view, are a target quality indicator, a range distance display, and other indicators. Within the TV view is a targeting reticle which indicates roughly the footprint of ranging laser pulses such that a target can be selected. The target quality indicator is a bar graph which displays the number of identifiable received reflected laser pulses from a series of such pulses emitted by the range finder. By aiming the range finder at various targets via the footprint reticle, repeatedly firing the range finder and monitoring the target quality graph for each firing, a user can move the range finder to find a surface proximate the target with a reflective quality sufficient to yield an accurate target range reading.

48 Claims, 11 Drawing Sheets

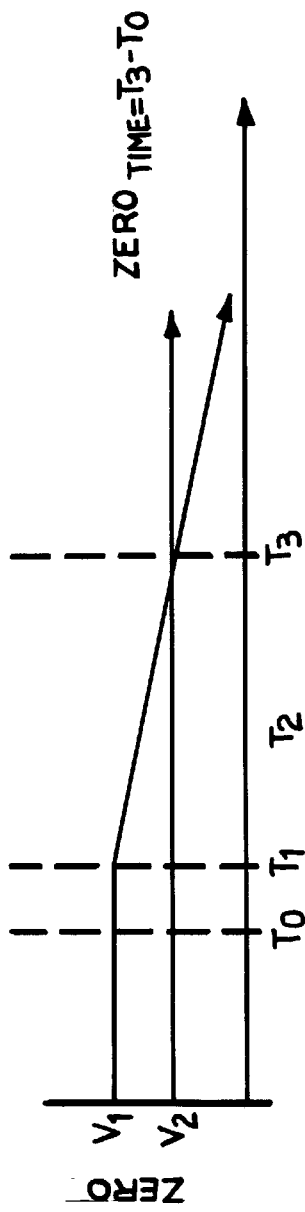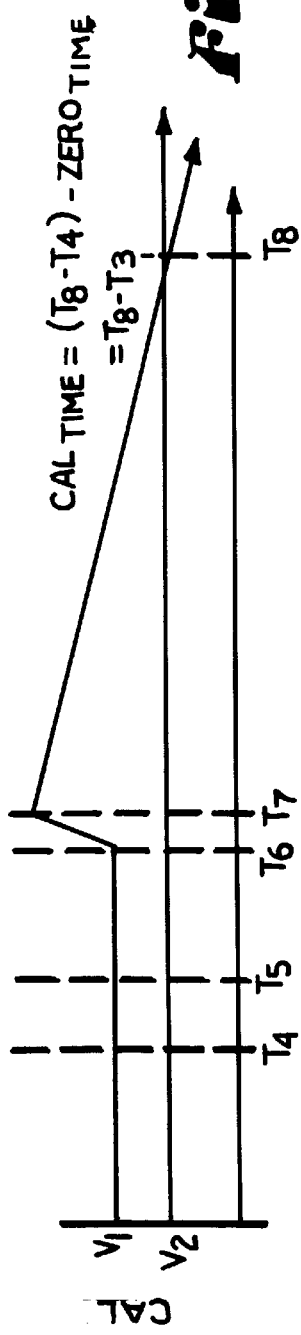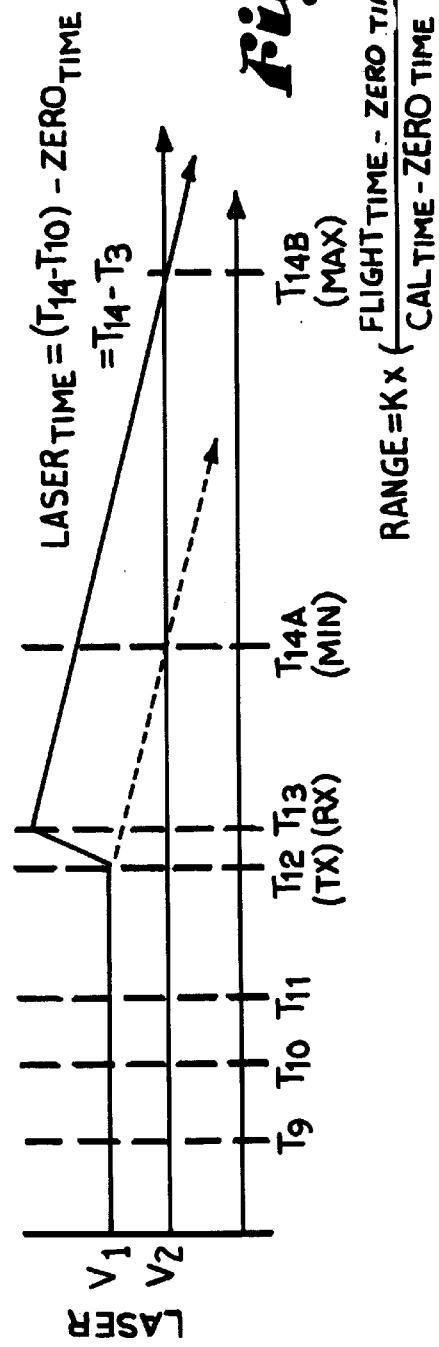

LASER RANGE FINDER WITH TARGET QUALITY DISPLAY

CROSS REFERENCE TO RELATED APPLICATION

The present application is a continuation of Ser. No. 08/433,749 of the same title, filed May 4, 1995, now U.S. Pat. No. 5,623,335.

BACKGROUND OF THE INVENTION

1. Field of the Invention

This invention is directed to a hand-held laser range finder, and, more particularly, to such a range finder with a TV-type viewing field and a reticle representing the laser footprint and with a target quality bar graph display.

2. Description of the Related Art

Laser range finders have been manufactured for a number of years. Typically such range finders send a laser pulse and receive the pulse as reflected from a target. An internal clock monitors the time difference between the transmitted and received pulses, halves the time difference and multiplies it by the speed of light to thereby derive a distance from the range finder to the target.

One problem with prior art range finders is that the measured time periods are so short that extremely fast clocks and very sophisticated circuitry are required for accurate distance ranging. Ideally a range finder should be capable of accuracy within approximately 1 meter at a 1000 meter range. For each additional meter of range, a laser light pulse takes approximately 3 nanoseconds extra in transit. This, then, is the shortest time period which must be measured. Thus, for distances of ±1 meter to be accurately measured, a clock with a frequency of 160 MHz is required. Processors capable of operating at this clock speed are expensive, which effectively prices typical prior art range finders well beyond the mass consumer market.

A method has been developed to obviate the need for such high frequency clocks in a laser range finder. This method, developed by Laser Tech, Inc. of Colorado, is described in application for U.S. patent Ser. No. 08/375,945, entitled LASER RANGE FINDER HAVING SELECTABLE TARGET ACQUISITION CHARACTERISTICS AND RANGE MEASURING PRECISION, filed Jan. 19, 1995, now U.S. Pat. No. 5,652,651, which is incorporated herein by reference. In the Laser Tech circuit, a series of 30 or more individual laser pulses are emitted each time a trigger switch is engaged. A charging circuit is triggered with the emission of each pulse whereby a capacitor is charged at a first, relatively rapid rate during the time of flight for each pulse. After each return pulse is detected, a discharging circuit is triggered which discharges the capacitor at a second, much slower rate. A microcontroller times the discharge period and calculates a range based upon the time of discharge by the use of a calibrated formula. In one example, the capacitor discharge rate was 1000 times slower than the charging rate, thus allowing an 8 MHz crystal oscillator to be used as a timer clock source to yield an accuracy of ±1 meter at a 1000 meter range. An automatic noise threshold circuit sets a minimum threshold noise level which allows reliable detection of reflected laser pulses and a dithering circuit selectively provides increased accuracy.

In the Laser Tech circuit a minimum number of valid reflected pulses must be received from the series of emitted pulses in order to yield a desired ranging accuracy. The number of received pulses is dependent upon the "target quality", i.e. the reflective capabilities of the target. This varies greatly among target materials, and other factors such as atmospheric conditions, open field versus brushy surroundings, etc. also effect the number and quality of received pulses. However, without information relating to target quality, a user of such a range finder would not be able to isolate the reason for a lack of a distance reading, i.e. low battery, equipment malfunction, target quality, etc.

It is clear then, that a need exists for a laser range finder which utilizes relatively slow speed clocks to accurately sense range distances to within ±1 meter. Such a laser range finder should include an indication of target quality such that a user of the range finder can be apprised of the reflective quality of the target, thus enabling him or her to select a different target feature in the event of a low quality target indication.

SUMMARY OF THE INVENTION

In the practice of the present invention, a laser range finder includes a circular in-sight field of view which incorporates within it a magnified "TV view" of the target area which roughly approximates the rectangular shape of a standard television picture. Also within the circular field, over and under the TV view, are a target quality indicator, a target range display, a sensitivity mode indicator and other indicators. Within the TV view is an aiming reticle which indicates roughly the footprint of ranging laser pulses emitted by the range finder such that a target can be reliably selected.

The range finder emits a series of laser pulses and times the flight time of each pulse from the range finder to the target and back. An average flight time for the pulse series is calculated to determine the range to the target. A microcontroller uses a pulse stack and comparator to detect and identify valid pulse returns and the number of pulse returns, either as an absolute number or as a ratio of returned to transmitted pulses, is output to a target quality indicator. The target quality indicator is a bar graph which graphs the number of identifiable received reflected pulses. By aiming the range finder at various targets via the footprint reticle, repeatedly engaging a fire button on the range finder and monitoring the target quality bar graph for each firing, a user can move the range finder around to find a surface proximate the target with a reflective quality sufficient to yield an accurate reading.

OBJECTS AND ADVANTAGES OF THE INVENTION

The principle objects and advantages of the present invention include: to provide an improved laser range finder; to provide such a laser range finder which emits a series of laser pulses toward a target with each engagement of a fire switch; to provide such a laser range finder which detects each identifiable reflected return pulse from said series; to provide such a laser range finder with a target quality indicator indicating the number of returned pulses or the ratio of the number of returned pulses vs. the number of emitted pulses; to provide such a laser range finder with laser pulses for accurately aiming the range finder; to provide such a laser range finder which is capable of using a relatively slow sampling clock to determine highly accurate target ranges; to provide such a laser range finder with a circular field of view; to provide such a range finder with a magnified "TV view" of the target area which forms a portion of the circular field of view; to provide such a laser range finder which can be produced at an economical cost, enabling sales to a mass consumer market; and to provide such a laser range finder which is attractive, rugged, reliable and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIGS. 13A, 13B and 13C are individual graphic representations of the voltages $V_1$ and $V_2$ of certain of the precision timing section circuit nodes during the zero, calibration and laser firing phases of operation from which the values $Zero_{TIME}$, $Cal_{TIME}$ and $Laser_{TIME}$ are derived to enable rapid and accurate calculation of the distance to an object from the laser range finder.

DETAILED DESCRIPTION OF THE INVENTION

1. Introduction and Environment

Figure 1:
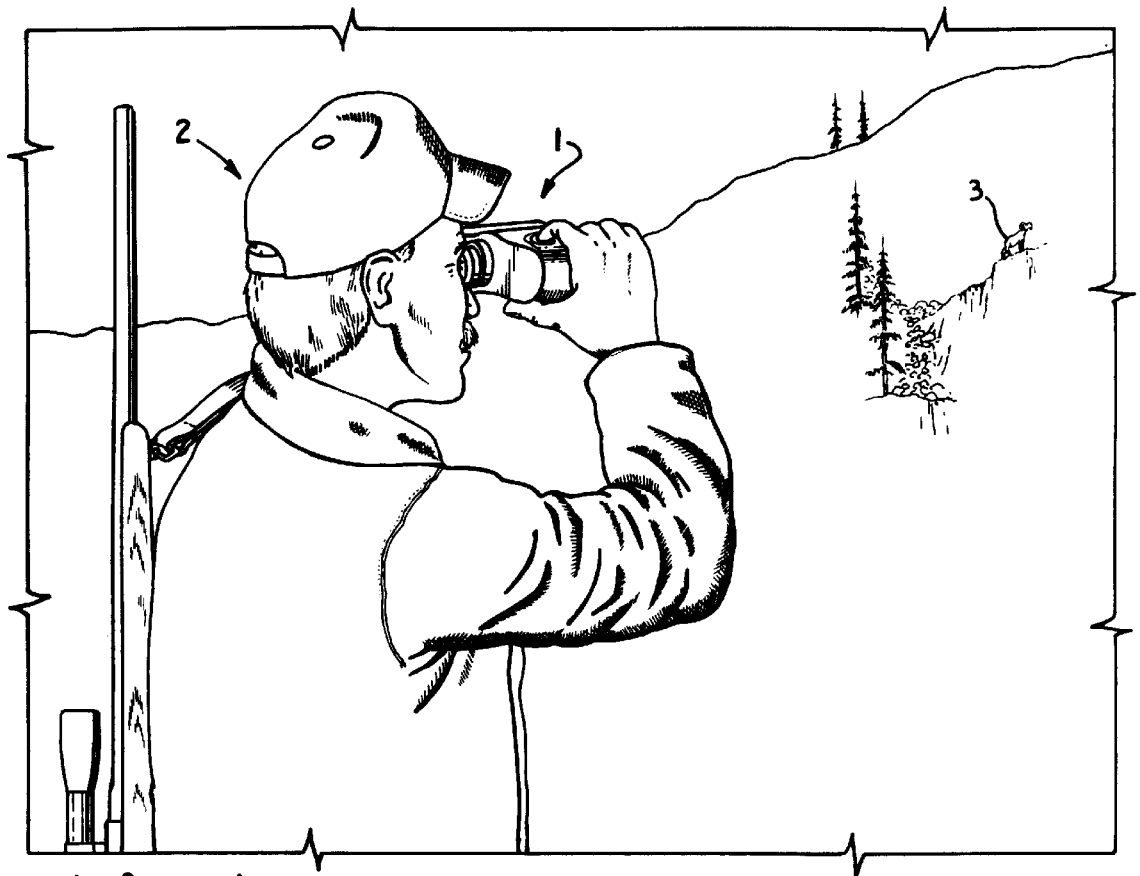
FIG. 1 is a perspective view of a hunter using the inventive laser range finder to determine the range to a target, with the target illustrated as a bighorn sheep.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up", "down", "right" and "left" will refer to directions in the drawings to which reference is made. The words "inward" and "outward" will refer to directions toward and away from, respectively, the geometric center of the embodiment being described and designated parts thereof. Said terminology will include the words specifically mentioned, derivatives thereof and words of a similar import.

2. Laser Range Finder

Referring to the drawings in more detail, and particularly FIGS. 1–5, the reference numeral 1 generally designates a laser range finder in accordance with the present invention. In FIG. 1, the range finder 1 is being used by a hunter 2 to range a target, here illustrated as a bighorn sheep 3. The rangefinder 1 includes circuitry and optics within a housing 4, which can comprise high impact plastic, for example. While the use of the range finder 1 by a hunter is illustrated and described herein, the description is not intended to be in any way limiting. Other uses for the inventive range finder 1 include, but are not limited to, golfing, to enable golfers to determine an accurate range to a flag stick, archery, military uses, real property surveying, etc.

Figure 3:
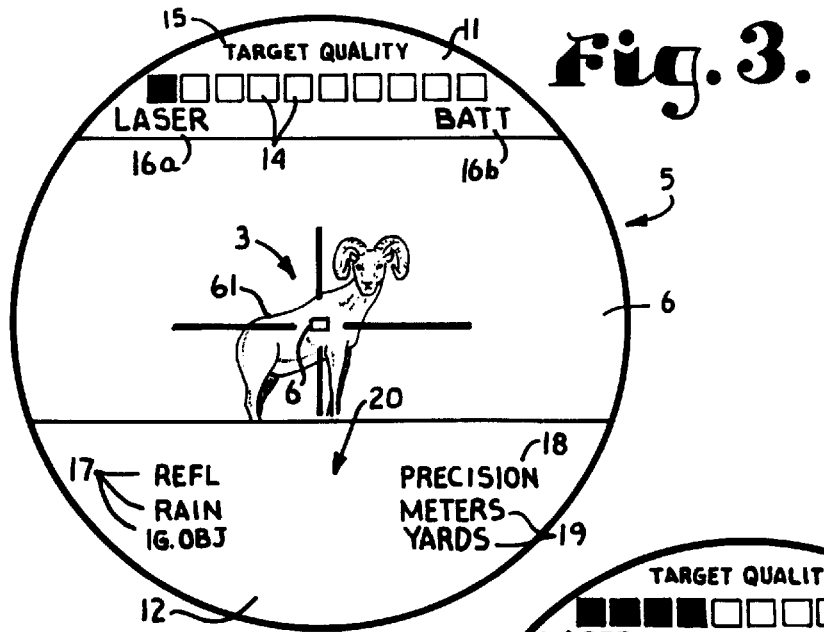
FIG. 3 is an enlarged representation of a circular field of view as seen through the range finder by the hunter of FIG. 1, with a target quality bar graph display indicating a relatively poor quality target and with no target range readout.
Figure 4:
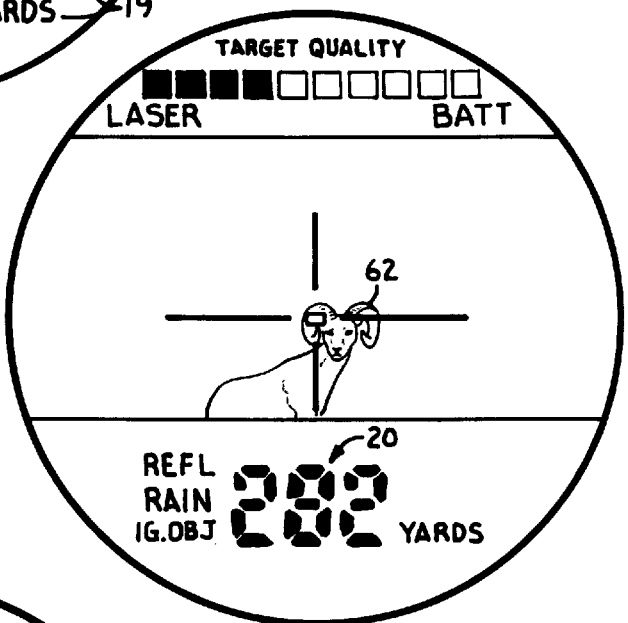
FIG. 4 is an enlarged representation of the circular field of view as seen by the hunter of FIG. 1, with a target quality indicator indicating a relatively good quality target and with a target range readout.
Figure 5:
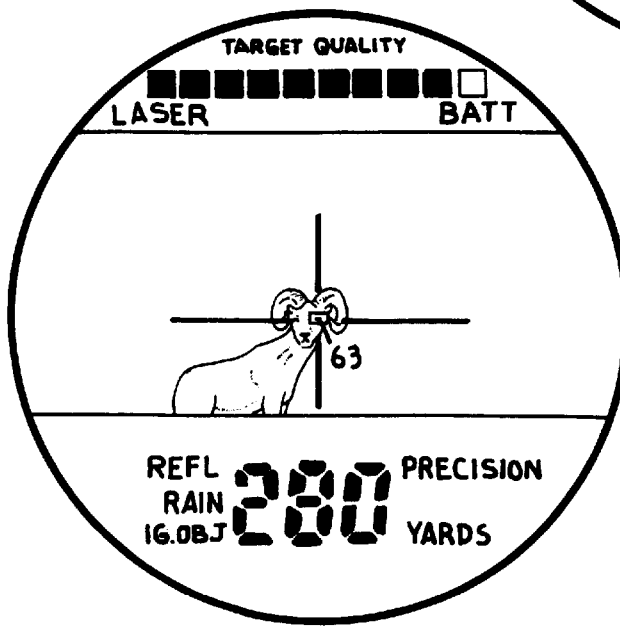
FIG. 5 is an enlarged representation of the circular field of view as seen by the hunter of FIG. 1, with a target quality indicator indicating an excellent quality target and with a highly accurate target range readout.

As the hunter 2 looks through the range finder 1, he sees a circular field of view 5, a center portion 6 of which is shaped as a "TV view" approximating the relative dimensions of a standard television screen. The range finder 1 optically presents a magnified image of the sheep 3 within the TV view section 6, as represented by FIG. 3. In one embodiment of the invention, a 4×magnification is achieved. The size of the sheep 3 represented in the TV view section 6 as shown in FIGS. 3–5 is exaggerated for purposes of explanation. A rectangular reticle 7, which approximates the footprint of laser pulses emitted by the range finder 1, is centered on the target, such as the sheep 3.

Also forming a portion of the circular field 5 are upper and lower information display areas 11 and 12, respectively. Within the upper display area 11, a bar graph 13 incudes a number of individual bar elements 14 along with permanent indicia 15 indicating "TARGET QUALITY" immediately above the bar graph 13. An indicia field 16a indicating the term "LASER" is located immediately below the bar graph 13, which field is highlighted during emission of laser pulses during ranging. A second indicia field 16b indicating "BATT" is highlighted during low battery conditions, as explained below.

Within the lower display area 12, on the left side, a sensitivity mode field 17 includes the alternative fields of "REFL", "RAIN", and "IGNORE OBJECT". On the right side of the display area 12, a "PRECISION" flag 18 is enabled when conditions enable the range finder 1 to achieve precision accuracy of ±1 yard. When the PRECISION flag 18 is not highlighted, conditions dictate an accuracy of ±3 yards. In addition, the measurement alternatives of "METERS" vs. "YARDS" can be selected and corresponding indicators 19 highlighted accordingly. Approximately centered between the sensitivity mode field 17 and the precision flag 18 is a seven segment display area 20 on which a target range is displayed.

Figure 6:
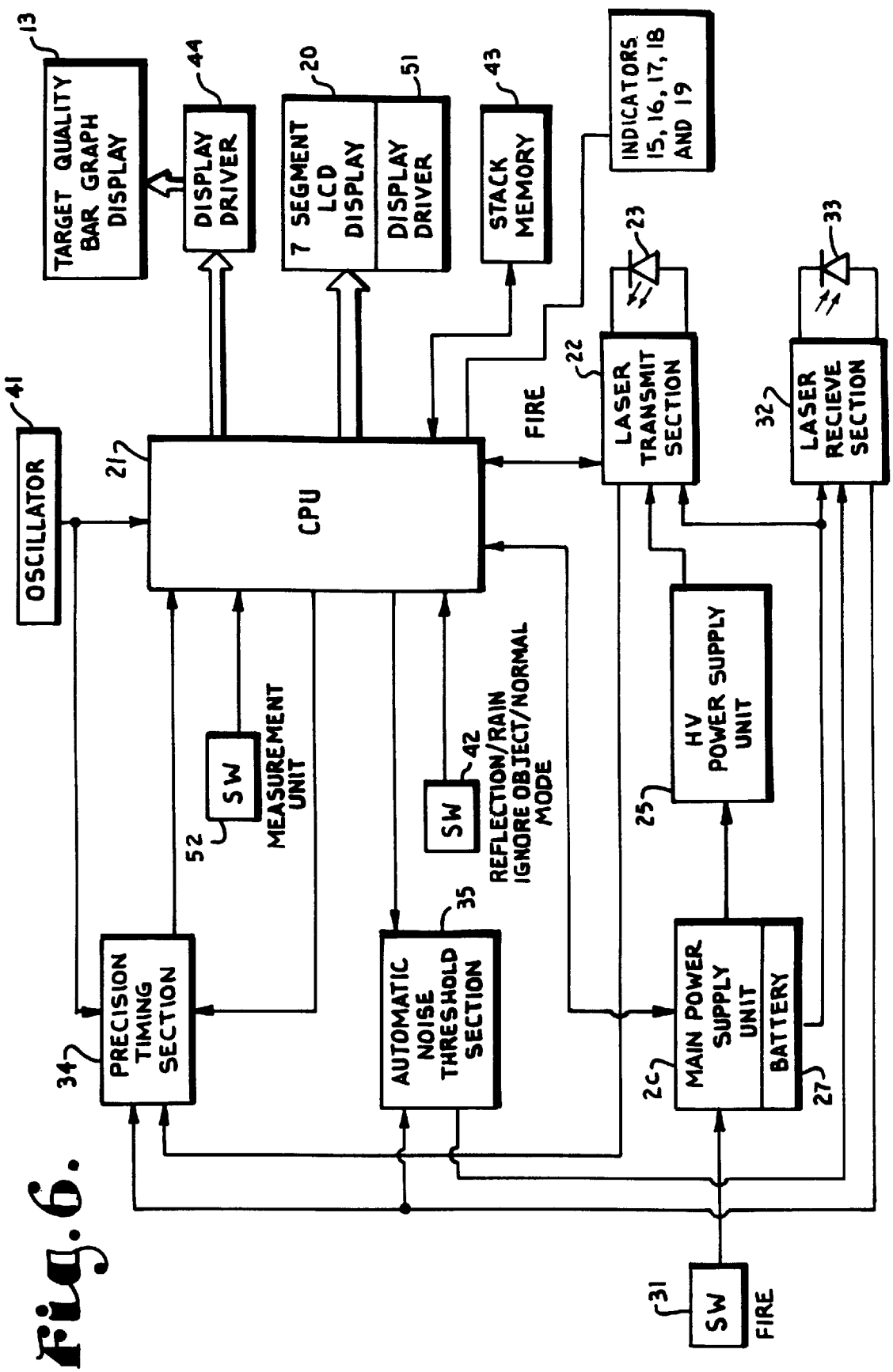
FIG. 6 is a block schematic electrical diagram of the laser range finder of FIGS. 1–5.

Referring to FIG. 6, the range finder 1 is illustrated in a block electrical schematic diagram. The range finder 1 includes a microcontroller 21 which is connected to a laser transmit section 22, which can comprise a power to laser diode 23 emitting infrared light beams with power supplied by a high voltage power supply 25, which is, in turn, supplied by a self-contained main power supply 26 including a battery 27. The microcontroller 21, once enabled via a fire switch 31 operated by the user 2, is programmed to cause the laser generator 22 to fire a series of laser light pulses, each with a duration of approximately 5 to 100 nanoseconds. The series can contain, for example 30 laser pulses, of which 20 are used for calibration purposes and the remaining 10 of which are used for ranging calculations. This generally gives an accuracy range of ±3 yards at distances up to a maximum ranging distance of approximately 1000 yards. For more precise measurements, where conditions allow, an additional 30 pulses are transmitted, all of which are used for range calculations, with the results indicated by the highlighting of the "PRECISION" flag 18 in the lower display area 12. In other words, when target quality and environmental conditions allow a precise range measurement to within ±1 yard, the PRECISION flag 18 is automatically highlighted to indicate to the user 2 that the indicated range is accurate to within ±1 yard.

Once the laser pulses are reflected off of the target, such as the sheep 3, a portion of each pulse is returned to a laser receive section 32 which includes a laser receiving diode 33. Detection of a received pulse triggers a precision timing section 34 and an automatic noise threshold section 35, each of which is described in detail in the above-referenced application Ser. No. 08/375,945.

Briefly, the precision timing section 34 charges a capacitor (not shown) at a first, relatively rapid rate during the flight time of an emitted laser pulse and discharges the capacitor at a much slower rate after detecting the return pulse. The discharge time is timed by the microcontroller 21, as clocked by an 8 MHz crystal oscillator 41 and the range to the target 3 is calculated based upon a predetermined, calibrated relationship between discharge times and range distances. The automatic noise threshold section 35 is basically a feedback circuit which establishes a minimum threshold noise level which is necessary to reliably detect reflected laser pulses. A mode switch 42 is used to select a sensitivity setting, such as "REFLECTION" mode indicated by highlighting the REFL flag in the mode window 18 with which the laser receive section 32 is completely desensitized, requiring a retro reflector or other high grade reflector to return sufficient energy to the range finder 1 to trigger a range calculation. Other possible modes to be selected via the switch 42 include NORMAL, "RAIN" or "IGNORE OBJECT" modes in which varying minimum ranging distances tolerated. For a normal setting, i.e. typical conditions with no rain and no obstruction between the user and a target, a minimum ranging distance of 15 yards is automatically established. No mode flag is highlighted for normal ranging minimums. During rain or other precipitation, if a minimum distance of 15 yards is used, reflection of laser pulses from rain drops at the minimum 15 yard distance will cause the range finder 1 to always indicate 15 yards. Accordingly, when the RAIN mode is selected, as indicated by highlighting the RAIN flag, minimum ranging distance is changed from 15 yards to 65 yards. At this minimum distance, any effect of interference by rain drops or other precipitation is negligible. Finally, when another object is stationed between the user and the target, such as when a tree branch or a bush is positioned at 80 yards but the target is beyond, at a distance of greater than 115 yards, the IGNORE OBJECT yard mode is selected and the IG. OBJ. flag highlighted. In this mode, minimum distance is changed to 115 yards so that the tree branch or bush at 80 yards is ignored during ranging calculations. This >115 mode can be referred to as the IGNORE OBJECT mode.

The microcontroller 21 includes a pulse stack memory section, represented by stack memory 43, in which pulse amplitudes and durations are stored as they are received. The microcontroller then compares each subsequent pulse with all of the stored pulses to determine a match. Any pulses which match are considered to be valid pulses and subsequent pulses can then be compared against the matched pulses. In this manner, legitimate laser pulse returns are distinguished from noise pulses. The microcontroller 21 then counts the received laser pulses and outputs the result to a display driver 44 which is connected to drive the bar graph 13. The greater the number of received pulses, the higher the number of displayed bars 14 on the bar graph 13. The bar graph 13 thus acts as an indicator of the reflective capacity of the target or of "target quality".

The microcontroller 21 is also programmed to lock onto a calculated target range when sufficient returned pulses are detected to provide an accurate readout. Normally at least two identifiable reflected laser pulses must be received and timed to allow an accurate range calculation, but the higher the ratio of received to emitted pulses, the more accurate is the range calculation. In the event that conditions and target quality permit a precision range measurement, additional pulses are transmitted, as described in the Laser Tech application, Ser. No. 08/375,945, and the PRECISION flag 18 is highlighted.

The seven segment range display 20 and a display driver 51 are connected to the microcontroller 21 to display the calculated target range once such a target range calculation is locked. A measurement unit select switch 52 is provided to select a range display of "METERS" or "YARDS" on the display section 19.

The bar graph 13 and the seven segment display 20, as well as the indicators 15–19 can utilize conventional LCD or LED, electrophoretic, ferro-electric, or other known display technology.

Figure 8:
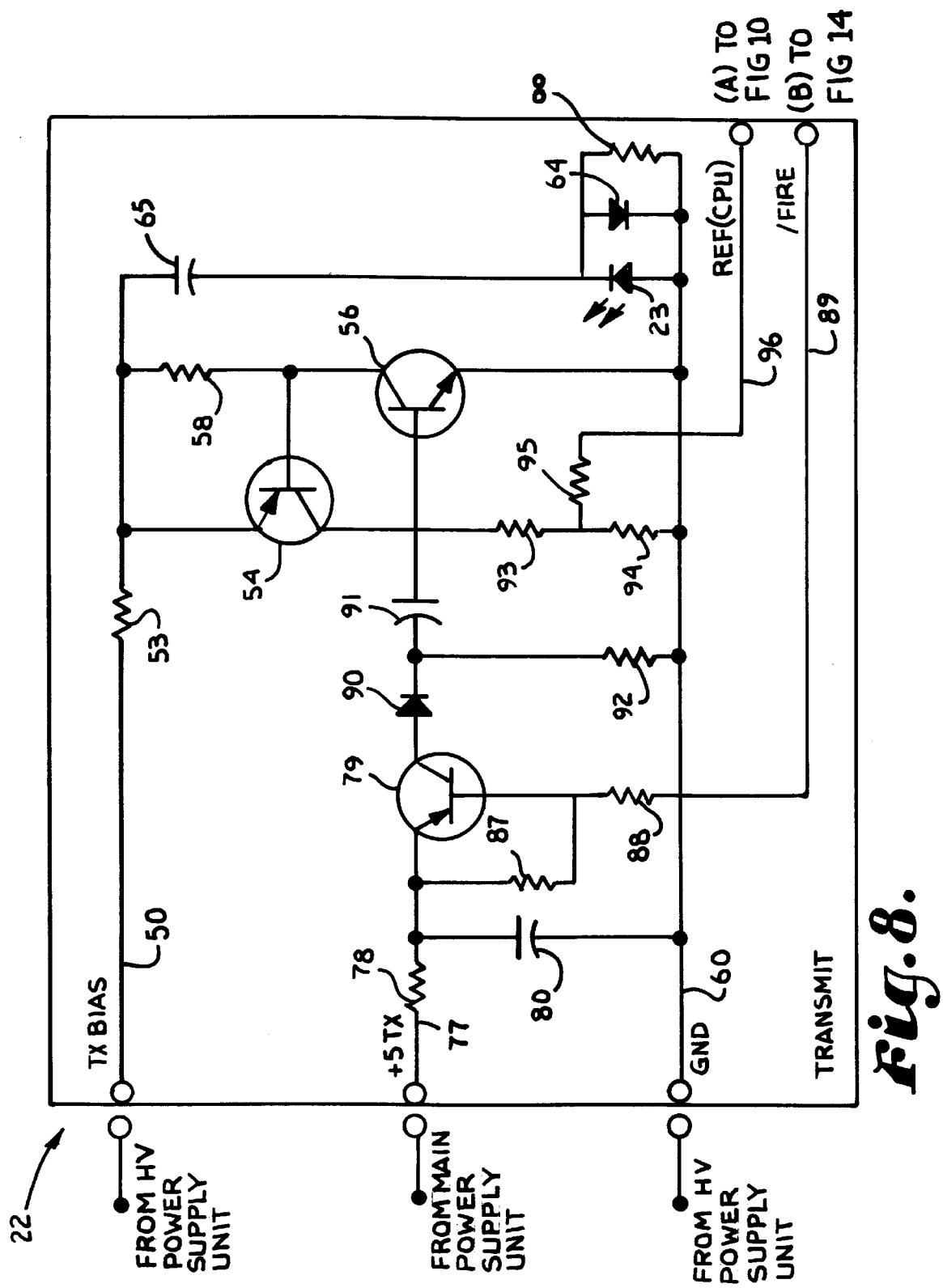
FIG. 8 is a detailed schematic diagram of the laser transmit section of FIG. 6 illustrating, inter alia, the laser signal producing diode and the associated driving and reference signal producing circuitry.

With reference now to FIG. 8, the laser transmit section 22 is shown in more detail. The laser transmit section 22 receives a transmit ("TX") BIAS signal on line 50 of approximately 110 to 140 volts for application through resistor 53 to the emitter of transistor 54. The emitter of transistor 54 is coupled to its base by means of a resistor 58 which also couples the collector of transistor 56 to resistor 53. The emitter of transistor 56 is connected to circuit ground on ground line 60. A capacitor 65 couples the emitter of transistor 54 to the cathode of the laser emitting diode 23 which has its anode also connected to circuit ground 60. An additional diode 64 is coupled is coupled in parallel with the laser emitting diode 23 having its anode connected to the cathode of the laser emitting diode 23 and its cathode connected to circuit ground 60. A resistor 66 is placed in parallel with the laser emitting diode 23 and the diode 64.

A source of +5 volts is also received by the laser transmit section 22 on supply line 69 through resistor 78. Resistor 78 is coupled to the emitter of transistor 79 as well as to circuit ground 60 through a capacitor 80. A resistor 87 couples the emitter of transistor 79 to its base which is coupled through resistor 88 to line 89 for supplying a /FIRE signal to the CPU section 21 (shown in FIG. 6).

An additional diode 90 has its anode connected to the collector of transistor 79 and its cathode coupled to circuit ground 60 through resistor 92. A capacitor 91 couples the cathode of diode 90 to the common connected collector of transistor 54 and base of transistor 56. The common connected collector of transistor 54 and base of transistor 56 are coupled through a voltage divider network comprising resistor 93 and resistor 94 to circuit ground. A resistor 95 coupled between resistor 93 and resistor 94 provides a REF signal on line 96 for application to the precision timing section 34 (shown in FIG. 6)

Figure 9:
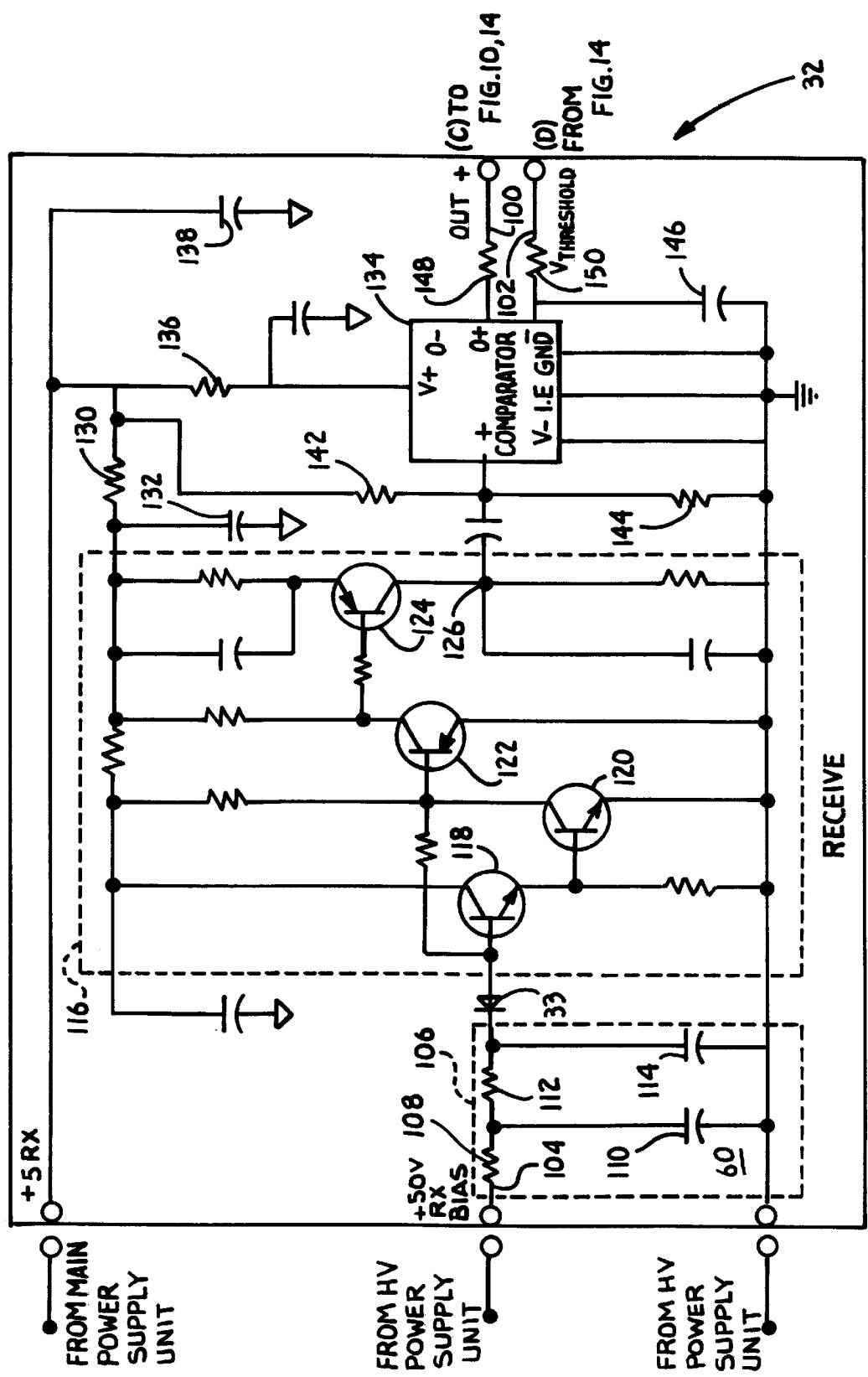
FIG. 9 is an additional detailed schematic diagram of the laser receive section of FIG. 6, illustrating, inter alia, the laser signal receiving diode, transimpedance amplifier and the precision comparator for establishing the $V_{threshold}$ and RX(OUT+) signals for the precision timing and automatic noise threshold circuits.

With reference additionally now to FIG. 9, the laser receive section 32 is shown in more detail. The output signals of the laser receive section 32 are the signals RX(OUT+) and $V_{threshold}$ provided on lines 100 (FIGS. 10, 14) timing section 34 and automatic noise threshold section 35 as previously shown in FIG. 6. A source of +50 volts providing a receive ("RX") BIAS signal is input to the laser receive section 32 from the HV power supply unit 25 on supply line 104. A low pass filter network 106 comprising resistors 108 and 112 in conjunction with capacitors 110 and 114 couples the supply line 104 to circuit ground 60 to provide a bias signal to the cathode of the laser receiving diode 33. The laser receiving diode 33 has its anode connected to the base of transistor 118 which, in conjunction with transistors 120, 122, and 124 comprises a transimpedance amplifier 116 providing an output on node 126 which is capacitively coupled to the "+" input of a precision comparator 134. A source of +5 volts is input to the laser receive section 32 from the main power supply unit 2c (shown in FIG. 6) for input to the transimpedance amplifier 116 through a low pass filter comprising resistor 130 and capacitor 132. The +5 volt RX supply voltage is also coupled to the V+ input of the precision comparator 134 through resistor 136 and is coupled to circuit ground through capacitor 138. The "+" input of the precision comparator 134 is connected between the +5 volt RX voltage source and circuit ground 60 through the node intermediate resistor 142 and resistor 144.

The precision comparator 134 which may, in a preferred embodiment, comprise a MAX 913 low power precision transistor-transistor logic ("TTL") comparator available from Maxim Integrated Products, Inc., Sunnyvale, Calif., has its "V−", "LE" and ground ("GND") inputs connected to circuit ground 60 as shown. A capacitor 146 couples the "−" output of the precision comparator 134 to circuit ground 60 as shown. The "0+"output of the precision comparator 134 is supplied through a resistor 148 to line 100 to provide the RX(OUT+) signal while the "−" output of the precision comparator 134 is supplied through resistor 150 to line 102 to provide the $V_{threshold}$ signal.

Figure 10:
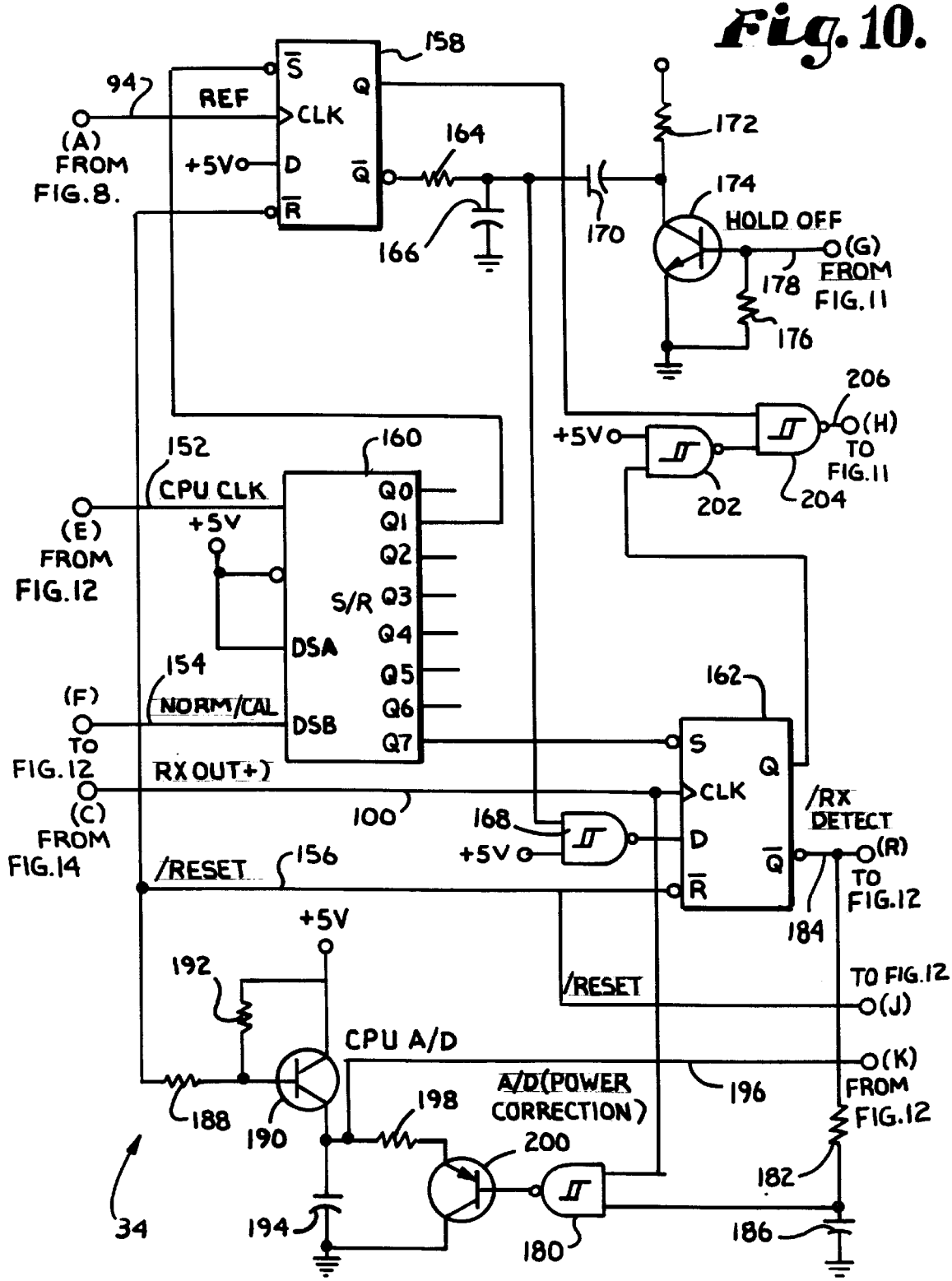
FIGS. 10 and 11 are further detailed schematic diagrams of the precision timing section of the laser range finder of FIG. 6 illustrating the circuit nodes for establishing the voltage V1 and V2 during the zero, calibration ("CAL") and laser firing phases of operation.

With reference additionally now to FIG. 10, a portion of the precision timing section 34 (shown in FIG. 6) is illustrated. A CPU clock ("CLK") signal is input to the precision timing section 34 on line 152 to the CLK input of a serial in/parallel out shift register 160 from the oscillator 41 as previously shown in FIG. 6. An additional input to the shift register 160 is received on line 154 comprising a NORM/CAL signal from the CPU section 21 to the data set B ("DSB") input thereof. The active low clear ("$\overline{CLR}$") input and DSA input are held high as shown.

An additional input to the precision timing section 34 is received from the CPU section 21 (shown in FIG. 6) on line 156 comprising a /RESET signal for input to the reset ("$\overline{R}$") inputs of D type flip-flop 158 and flip-flop 162. The $\overline{Q}$ output of flip-flop 158 is supplied as one input to an invertor comprising a portion of a NAND Schmitt trigger 168 through a low pass filter comprising resister 164 and capacitor 166 as shown. The remaining input to the invertor 168 is connected to a source of +5 volts.

A resistor 172 couples a source of +5 volts to the collector of transistor 174 having its emitter coupled to circuit ground. The collector terminal of transistor 174 is coupled through capacitor 170 to the input of the invertor 168 coupled to the $\overline{Q}$ output of flip-flop 158. Transistor 174 has its base coupled to circuit ground through resistor 176 and receives a HOLD OFF signal on node 178 received from the CPU section 21.

The flip-flop 158 receives an input to its CLK terminal on line 97 comprising the REF output signal from the laser transmit section 22 (shown in FIG. 6). Its data ("D") input is coupled to a source of +5 volts and the Q1 output of the shift register 160 is provided to the active low set ("$\overline{S}$") input as shown. The Q output of flip-flop 158 is supplied as one input to a transmit gate 204 having its other input coupled to the output of an invertor comprising an additional NAND Schmitt trigger 202. Invertor 202 has one input connected to a source of +5 volts and another input connected to the Q output of flip-flop 162. Flip-flop 162 has its S input coupled to the Q7 output of shift register 160 and its D input connected to the output of invertor 168. The Q output of flip-flop 162 is supplied on line 184 to comprise a /RX DETECT signal for input to the CPU section 21 (shown in FIG. 6). The flip-flop 162 has its CLK input connected to line 100 for receiving the RX(OUT+) signal from the laser receive section 32 (shown in FIG. 6) which is also supplied as one input to NAND Schmitt trigger 180. The other input of NAND Schmitt trigger 180 is connected to line 184 through resistor 182 and coupled to circuit ground through capacitor 186. The output of Schmitt trigger 180 is supplied to the base electrode of transistor 200 which has its collector terminal coupled to circuit ground. Line 196, comprising analog-to-digital ("A/D") POWER CORRECTION signal is supplied to the emitter terminal of transistor 200 through resistor 198 as well as to the collector terminal of transistor 190 which is coupled to circuit ground through capacitor 194. The /RESET signal on line 156 is supplied to the base terminal of transistor 190 through resistor 188. A source of +5 volts is connected to the emitter of transistor 190 as well as through resistor 192 to the base of transistor 190 to provide an operating bias.

Figure 11:
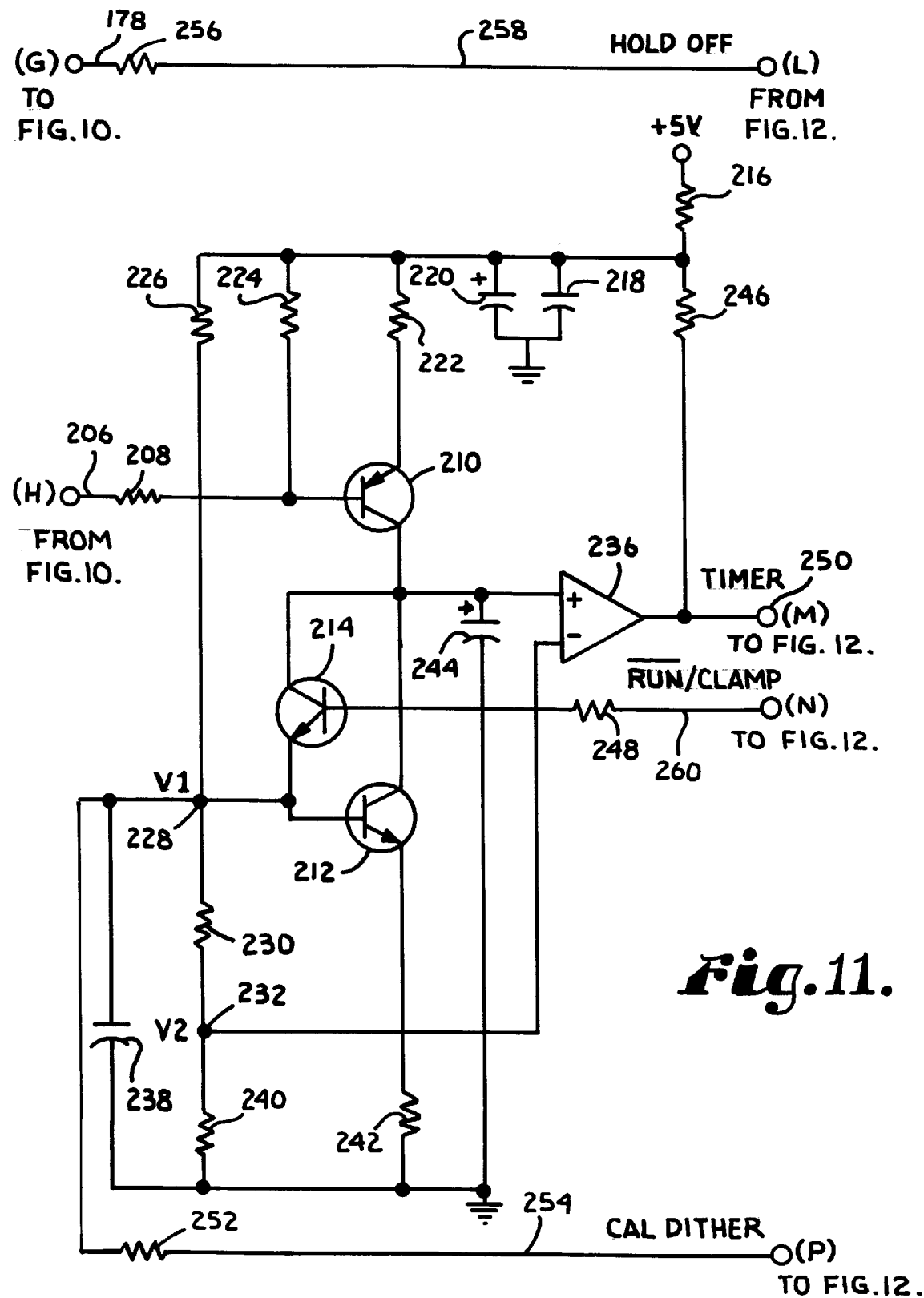

Referring additionally now to FIG. 11, the remaining portion of the precision timing section 34 (shown in block form in FIG. 6) is illustrated. The HOLD OFF signal output from CPU section 21 to the precision timing section 134 is supplied on line 258 through resistor 256 to node 178 for input to the base of transistor 174 (shown in FIG. 10).

The output of transmit gate 204 appearing on node 206 is supplied through resistor 208 to the base terminal of transistor 210. A source +5 volts is supplied to the emitter terminal of transistor 210 through the series connection of resistor 216 and resistor 222. The node intermediate resistors 216 and 222 is coupled to circuit ground through the parallel combination of capacitors 218 and 222 as well as to the output of comparator 236 through resistor 246 to provide a TIMER signal on line 250 for input to the CPU section 21 as will be more fully described hereinafter. The source of +5 volts is also connected to the base terminal of transistor 210 through the series connection of resistors 216 and 224. A $V_1$ node 228 at the common connected base of transistor 212 and emitter of transistor 214 is coupled through a source of +5 volts through resistor 216 and resistor 226. Node 228 is connected through resistor 230 to $V_2$ node 232 which, in turn, is connected to circuit ground through resistor 240. A capacitor 238 couples $V_1$ node 228 to circuit ground. $V_2$ node 232 is connected to the "−" input of comparator 236. $V_1$ node 228 is connected to line 254 from the CPU section 21 (shown in FIG. 6) to receive the CAL DITHER signal through resistor 252.

The collector terminal of transistor 210 is coupled to the collector terminals of transistors 212 and 214 as well as to the "+" terminal of comparator 236 which, in turn, is coupled to circuit ground through capacitor 244. A $\overline{\text{RUN}}$/CLAMP signal output from the CPU section 21 (shown in FIG. 6) is furnished on line 260 through resistor 248 for input to the base terminal of transistor 214.

Figure 12:
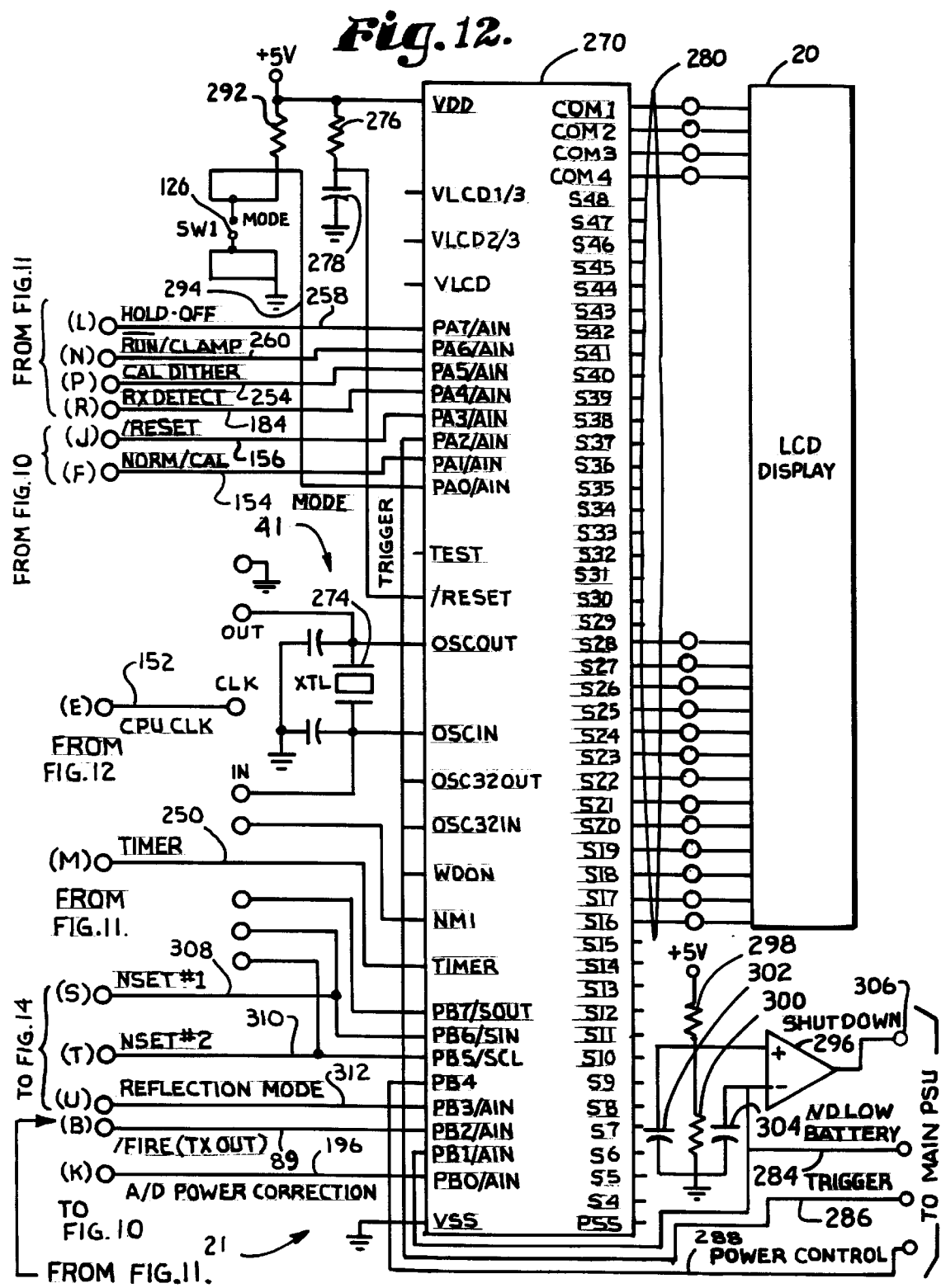
FIG. 12 is an additional detailed schematic diagram of the central processing unit ("CPU") portion of the laser range finder of FIG. 6 illustrating the CPU, associated oscillator and the in-sight liquid crystal display ("LCD") for displaying measured distances to an operator of the laser range finder in addition to the various signals for operative association with the precision timing and automatic noise threshold sections thereof.

With reference additionally now to FIG. 12, the CPU section 21 is shown in greater detail. The CPU section 21 comprises, a pertinent part, a microcomputer 270 which may, in a preferred embodiment, comprise a ST6240 device. An 8 megahertz ("MHz") crystal 274 forms a portion of the oscillator 41 for providing an oscillator ("OSCIN") and oscillator out ("OSCOUT") signal to the microcomputer 270 as well as supplying a CPU CLK signal on line 152 for input to the precision timing section 34 as previously described. The VDD input of microcomputer 270 is coupled to a source of +5 volts and the /RESET input thereof is held high through pull up resistor 276 which is coupled to circuit ground through capacitor 278. Output from the microcomputer 270 is taken on display bus 280 comprising the communication ("COM") lines COM 1–COM 4 and S16–S28 lines for input to the LCD display 23.

An A/D LOW BATTERY signal, a TRIGGER signal, and a POWER CONTROL signal are input to the microcomputer 270 on lines 284, 286, and 288 respectively. The A/D LOW BATTERY signal on line 284 is also supplied to the "−" input of comparator 297 which is coupled to circuit ground through capacitor 304. The "+" input of comparator 297 is coupled to a source +5 volts through resistor 298 which is also coupled to circuit ground through the parallel combination of resistor 300 and capacitor 302. The output of comparator 297 appearing on line 306 provides a SHUTDOWN signal for the laser range finder 1 in the event the onboard battery voltage drops below a predetermined limit.

The microcomputer 270 supplies the HOLD OFF signal on line 258, the $\overline{\text{RUN}}$/CLAMP signal on line 260, the CAL DITHER signal on lie 254, the /RESET signal on line 156 and the NORM/CAL signal on line 154 for input to the precision timing section 34 as has been previously described. The microcomputer 270 receives as outputs from the precision timing section 34 the /RX DETECT signal on line 184 and the TIMER signal on line 250. Additional inputs to the microcomputer 270 are the /FIRE signal on line 89 from the laser transmit section 22 (shown in FIG. 6) as well as the A/D POWER CORRECTION signal on line 196 from the precision timing section 34 (as shown in FIG. 10). A MODE input signal on line 294 is received from the mode switch 42 which is otherwise held to a +5 volts through resistor 292. Microcomputer 270 supplies an NSET1 and NSET2 signal on lines 308 and 310 respectively as well a REFLECTION MODE signal on line 312 for input to the automatic noise threshold section 35 (as shown in FIG. 6).

In overall operation, a reference signal (REF) on line 97 is generated by the laser transmit section 22 (shown in FIG. 8) when the laser range finder 1 is fired by placing a current pulse through the laser emitting diode 23 in response to manual actuation of the trigger switch 31. The REF signal on line 97 is derived from the current placed through the laser emitting diode 23 and not from the light pulse itself and is sufficiently precise for accurately indicating the time of the laser firing. The REF signal is ultimately input to the CLK input terminal of flip-flop 158, which has its Q output coupled to the transmit gate 204, which then turns on the current switch comprising transistor 210, and starts charging the capacitor 244. When the receive pulse RX(OUT+) on line 100 comes back from the laser receive section 32 (shown in FIG. 9), it triggers the flip-flop 162 at its CLK input. Flip-flop 162 has its Q output coupled to the input of invertor 202 which then shuts the transmit gate 204 off, stopping the current pulse. At this point, a constant current sink discharges capacitor 244. In this manner, capacitor 244 is charged up with a relatively large current (on the order of 10 milliamps), and later discharged with a small current (on the order of 10 microamps) applied over the entire flight time of the laser pulse from its firing from the laser emitting diode 23 to its reflection from a target back to the laser receiving diode 33. Because the laser range finder 1 is intended for a shorter maximum range than other laser based range finding instruments, the use of this technique does not require a separate counting oscillator followed by an interpolation operation and the entire flight time is essentially stretched by a factor of 1000 and then the stretched result is counted. By charging capacitor 244 at a fast rate and then discharging it and then monitoring the time it takes to discharge, the flight time is expanded so that the slower clock in the CPU section 21 can then count it accurately. The microcomputer 270 utilized in the CPU section 21 has a 1.5 microsecond resolution and, because the incoming flight time has been expanded by a factor of 1,000 on the input side to the precision timing section 34, it is the equivalent of a 1.5 nanosecond resolution, which corresponds to a measurement resolution for the laser range finder 1 of on the order of nine inches. Therefore, given that the laser range finder 1 is intended to be a one-yard instrument with a nine-inch resolution, sufficient resolution is provided to be able to measure distances up to a thousand yards to a one-yard accuracy.

The precision timing section 34 of the laser range finder 1 has three distinct modes of operation including a zero calibration, fixed pulse width calibration and laser measurement function as will be more fully described hereinafter. The portion of the precision timing section 34 comprising transistors 210, 214, and 212 (shown in FIG. 11) is the essence of the integrating flight time expander. Transistor 210 functions as a current switch which is turned on for the duration of the laser flight time in the laser mode of operation and is also turned on for the duration of whatever calibration pulse is placed into it during the calibrate mode. In the latter instance, a calibration pulse is supplied by the shift register 160 via flip-flop 158 and the start and end of the calibration pulse is gated via transmit gate 204 to actually turn the transistor 210 on and off in order to function as a current source, typically sourcing 10 milliamps of current. It should be noted that prior to turning transistor 210 on, transistor 214 must first be turned off and, when the system is in the reset state ready to start the whole measurement sequence, transistor 210 is off. Transistor 212, which is the current sink in the system, is always on, and typically sinks on the order of 10 microamps of current. In the reset condition, transistor 214 is on, and that clamps the voltage at the top plate of capacitor 244 to a voltage level designated as V1 at node 228. A voltage V2 is defined as the voltage at node 232 at the "−" input of comparator 236. It should also be noted that a metal oxide semiconductor filed effect transistor ("MOSFET") may be utilized for transistor 210 and would exhibit a much lower offset than the bipolar device shown. However, due to the lower cost of bipolar transistors and the fact that any offset cancels during the processing of the signal, a bipolar transistor is entirely adequate for this purpose.

When transistor 214 is on, the voltage on the positive plate of capacitor 244 is clamped to voltage V1, plus a fixed offset due to the transistor 210, which is small and typically on the order of 50 millivolts. During the zero calibration function, transistor 214 is turned on by holding the $\overline{\text{RUN}}$/CLAMP signal on line 260 high, thereby applying a positive current to its base through resistor 248. To initiate the zero calibration, the TIMER signal on line 250 is asserted and supplied to the microcomputer 270 of the CPU section 21. Utilizing the ST6240 unit shown in FIG. 12, when the microcomputer TIMER pin is held high, the device is counting. Conversely, the microcomputer stops counting when the pin is allowed to go low. In operation, the output comparator 236, determines whether or not the voltage at the top plate of capacitor 244 is greater or less than V2, and its output determines whether the TIMER pin on the microcomputer 270 is high or low. In the normal reset condition, the output of the comparator 236 is high, which means the timer is active. In sequence, the microcomputer 270 initiates the TIMER function and then turns off transistor 214 by lowering the control signal $\overline{\text{RUN}}$/CLAMP on line 260, to unclamp capacitor 244. Capacitor 244 then starts discharging towards zero due to the current being drained out of it via transistor 212 at a rate of about ten microamps. When it has discharged such that the charge removed drops the voltage V1 at node 228 to the level of V2, the output of the comparator 236 changes state to stop the TIMER function. (In the particular embodiment shown, V1 is typically on the order of 1.0 volts and V2 is about 0.9 volts.) The microcomputer 270 of the CPU section 21 now has a count value that relates to the amount of time it takes for capacitor 244 to discharge from Vi down to V2. This process is repeated several times and the result is averaged. Typically ten iterations may be performed with the results accumulated and an average time computed.

As shown particularly with respect to FIG. 11, the CAL DITHER signal on line 254 is applied to the base terminal of transistor 212 and is utilized during both the zero calibration and fixed pulse width calibration times and incorporates a relatively high value resistor 252. The CAL DITHER signal allows for the introduction of a deliberately controlled change in the discharge current in order that the resultant count will vary slightly such that when the total counts are averaged together, a finer resolution is produced than would be the case merely using a fixed current to get the same count value. An adjustment of one part in about a thousand is provided during the zero calibration and fixed pulse width calibration modes because the finite resolution of the microcomputer 270 timer otherwise provides discrete timing intervals of 1.5 nanoseconds which would only provide distance measurement resolution of approximately one yard. In operation, the zero calibration count in the microcomputer 270 will typically be about 150 while in the fixed pulse width calibration mode it will be on the order of 900. The flight time count during the laser mode of operation can be anything from close to the zero calibration value to about 4500.

For example, during the zero calibration mode, the count value in the microcomputer 270 might be 150 but there is no way of knowing just how close the count actually is to 149 to 151. By utilizing the CAL DITHER signal to force the count over a couple of count boundaries (for example: 150, 150, 150, 151, 151, 152) the resolution of the counter may be effectively raised by a factor of two without having to utilize additional fine counters. In the embodiment shown, the resultant resolution is sufficient to maintain calibration to plus or minus one yard over a range of one thousand yards or less. Although implementations may vary, the CAL DITHER signal may be held high for five out of ten pulses and low for the remainder to provide the foregoing resolution enhancement.

Due to the fact that the actual laser flight time varies due to noise in the laser pulses and variability in target aiming, there is generally enough scatter in the measured laser flight time such that it covers more than one clock boundary and so will automatically average to a higher resolution through the use of the precision timing section 34 without invoking the CAL/DITHER function in the laser mode of operation.

With reference additionally now to FIGS. 13A, 13B and 13C, the operation of the precision timing section 34 is shown in the zero calibration, fixed pulse width calibration and laser measurement function modes of operation respectively. In its normal state, the voltage on the top plate of capacitor 244 is clamped to V1, and at a time $T_0$, the precision timing section 34 will initiate the TIMER by changing the output state of comparator 236 to the logic high state. After a very short fixed number of instructions later shown in $T_1$, the clamp transistor 214 will be turned off and the voltage on capacitor 244 will begin discharging slowing until that voltage crosses V2 at time $T_3$, when the output of comparator 236 will change state. In essence, during the zero calibration process, transistor 210 is never turned on thereby determining the timing conditions of what would effectively be a zero flight time. Therefore, if there is no charge current applied to capacitor 244, $T_3-T_0$ is the time that would be in the microcomputer 270 and the timer in whatever units they operate, which is usually dependent on the CPU section 21 crystal frequency. In the embodiment shown, the microcomputer 270 utilizes an 8 MHz crystal and the internal timer has a 1.5 microsecond resolution resulting in a count of about 150.

During the fixed pulse width calibration process (shown particularly in FIG. 13B) at time $T_4$, once again the microcomputer 270 stops the TIMER and a short time later at $T_5$ it releases the clamp. At $T_6$, a known pulse width is applied to the base terminal of transistor 210 which is precisely derived from the main oscillator 41 as applied to the CLK input of the shift register 160. The signal applied to the CLK input of the shift register 160 directly the main oscillator 41 and the serial data input to the shift register 160 is a logic line 154 from the CPU section 21 designated NORM/CAL. When the NORM/CAL signal is high, the precision timing section 34 is in its normal mode of operation and, when it drops to a logic low state, the fixed pulse width calibration function is initiated. Thereafter, typically about fifth microseconds later, at time $T_6$ the NORM/CAL signal on line 154 will be dropped low. It should be noted that during both the zero and the fixed pulse width calibration modes, the logic reset signal /RESET on line 156 is held low, its active state. In the logic low state the two flip-flops 158, 162, determine whether the input signal comes from shift register 160 which generates the fixed pulse width or whether it comes from the REF and RX(OUT+) signals and relates to an actual laser flight time. The /RESET signal is generally held low at all times during the fixed pulse width calibration process so that any noise on the RX(OUT+) receive line 100 will not accidently clock flip-flop 162 and therefore trigger the precision timing section 34 resulting in an indeterminate time period measurement invalidating the calibration. The reset state for the Q outputs of flip-flops 158, 162 is low but is high for the $\overline{Q}$ outputs. Therefore, the $\overline{Q}$ outputs cannot be directly driven with the reset circuit and must be driven off the Q outputs in both cases which introduces a small fixed offset delay which must be accounted for later. As soon as the NORM/CAL signal on line 154 is dropped low, which occurs approximately 50 microseconds after the clamp has been released, the low signal propagates through the shift register 160 precisely with the main oscillator 41 clock. The Q0 output of the shift register 160 is the first to be triggered but is not used because it is used to synchronize with the incoming signal. The Q1 is then the first output of the shift register 160 to be utilized and on every positive edge of the clock the zero signal that is applied into the serial input will propagate one state of the shift register 160 from Q zero to Q7. Therefore, the Q1 output will go low first, and as soon as that output goes low, the set line input $\overline{S}$ forces the Q output of flip-flop 158 to go high since the Q output of flip-flop 162 is in the low state. As a result, logic level ones appear at the two inputs of the transmit gate 204, which turns on the current switch transistor 210. Exactly six clocks later, the same thing happens with flip-flop 162 which has its $\overline{S}$ input coupled to the Q7 output of the shift register 160. As the Q output of flip-flop 162 goes high, the output of the invertor 202 goes low, and the transmit gate 204 will be turned off. At this point the count pulse will stop meaning that the fixed width pulse feeding the current switching circuit at the output of the transmit gate 204 is precisely six clock cycles. The time difference between the Q1 and Q7 outputs of the shift register 160 is exactly 750 nanoseconds when utilizing an 8 MHz oscillator 41 applied to its CLK input. The invertor 202 adds an additional delay of about 10 nanoseconds for a total delay of about 760 nanoseconds which varies only slightly with temperature, perhaps one or two nanoseconds, yet still provides sufficient precision for measurements of less than one yard resolution.

Transistor 210 is then turned on for a period of time between $T_6$ and $T_7$ to enable the capacitor 244 to charge very rapidly and then discharge at the same rate as has been previously shown with respect to FIG. 13A. As V1 reaches the level of V2 the TIMER signal goes low at Time $T_8$. The fifty microsecond delay between the unclamping at $T_5$ and $T_6$ is to allow the clamp transistor 214 to turn off fully since it is a relatively inexpensive bipolar device. If MOSFET were used instead, its turn off would be virtually instantaneous and the additional delay it introduced would not be a problem because the microcomputer 270 could not issue the next instruction quickly enough. Utilizing a bipolar device, approximately 20 microseconds are required for the discharge to become linear and the slope of the discharge curve between $T_7$ and $T_8$ is then identical to the slope from $T_1$ to $T_3$ in the zero calibration mode except for the step due to the charging of capacitor 244. As a consequence, the value of $ZERO_{TIME}$ equal $T_3$ minus $T_0$ and the value of $CAL_{TIME}$ value equals the time due to the $CAL_{TIME}$ value not due to the $ZERO_{TIME}$ value, which is, $T_8$ minus $T_4$ minus the $ZERO_{TIME}$ value or $T_8$ minus $T_3$.

In essence then, very small flight times are effectively disregarded and the value of $CAL_{TIME}$ is known. Therefore, with the zero calibration function and the addition of a known calibrated pulse width, the time delay at zero is known together with the time delay for the known pulse width providing the origin and scale for determining distance with a constant linear discharge of capacitor 244.

With particular reference additionally to FIG. 13C, the operation of the precision timing section 34 is shown in the laser measurement mode of operation. The laser measurement operation is essentially the same as the fixed pulse width calibration mode except that the NORM/CAL signal on line 154 to the shift register 160 is held high and the /RESET signal on line 156 is taken high at time $T_9$ to enable the flip-flops 158, 162 to trigger. At time $T_{10}$ the timer is started and at $T_{11}$, (at precisely the same relationship $T_{11}$ minus $T_{10}$ equals $T_5$ minus $T_4$ equals $T_1$ minus $T_0$) the clamp is released. There is normally a fifty microsecond wait and then the laser pulse is fired when the microcomputer 270 asserts the /FIRE signal on line 89 to initiate the firing sequence. Upon firing the laser emitting diode 20, the laser transmit section sends the REF signal on line 97 to the CLK input of flip-flop 158 of the precision timing section 34. This opens the transmit gate 204 which turns on the current source transistor 210, which, in turn, charges capacitor 244 at a known rate.

When the reflected laser pulse is detected by the laser receiving diode 33 of the laser receive section 32 (shown in FIG. 3), the RX(OUT+) signal on line 100 is directed to the CLK input of flip-flop 162. The Q output signal of flip-flop 162 is inverted by invertor 202 which turns off the transmission gate 204 so that the current source transistor 210 is on for the flight time duration of the laser pulse to charge capacitor 244 to a level determined by the timer during that flight time. The charge applied to the capacitor 244 may be anything from just a few millivolts (essentially zero distance and flight time) to up to two volts (maximum range and flight distance) depending on the distance to the target. Time $T_{12}$ represents the firing of the laser as indicated by the REF signal and $T_{13}$ represents the receipt of the reflected laser signal as indicated by the RX(OUT+) signal. Transistor 210 is turned on at $T_{12}$ and turned off at $T_{13}$. As a consequence, V1 will equal V2 at anytime between $T_{14A}$ (minimum distance when $T_{12}$ and $T_{13}$ are essentially coincident) and $T_{14B}$ (maximum range of the laser range of the laser range finder 10). Times $T_{14A}$ through $T_{14B}$ represent the range of times (depending on the distance to the target) when the value of V1 is discharged below the level of V2 and the comparator 236 output changes state stopping the timer.

The actual laser flight time $LASER_{TIME}$ (or $FLIGHT_{TIME}$) then equals $T_{14A}$ (or $T_{14B}$) minus $T_{10}$ minus $ZERO_{TIME}$ or, $T_{14}$ minus $T_{13}$. The time $T_8$ has to be greater than $T_3$, and $T_{14}$ is greater than or equal to $T_3$. There is no theoretical limit on the lower range of the laser range finder 1 and flight time (and distance) can be measured down to zero due to its linearity. The only factors in the near zero range are the time it takes to transistor 210 to turn on, the propagation time of the laser beam and the various circuit gates, but since the time for each of these factors is the same during calibration as during flight time, they essentially cancel out. The precision timing section 34 can be effectively utilized down to on the order of ten nanoseconds and still remain perfectly linear. RANGE to a target is then a constant, "k" times the quantity $FLIGHT_{TIME} - ZERO_{TIME}$ over $CAL_{TIME} - ZERO_{TIME}$.

For each of the values: $ZERO_{TIME}$, $CAL_{TIME}$ and $FLIGHT_{TIME}$ values are accumulated and are expressed in time units that derive from the very accurate crystal oscillator 30. Typically, ten pulses may be utilized to establish the $ZERO_{TIME}$ average, ten pulses to establish the $CAL_{TIME}$ average and ten pulses to establish the minimum precision (or rough) $FLIGHT_{TIME}$ range to the target. Another group of ten through thirty laser pulse FLIGHT$_{TIMES}$ may be also averaged in order to obtain a higher precision distance to a target as indicated by a "precision flag" which may be displayed on the LCD display 23 within the laser range finder 1 eyepiece. Nevertheless, the actual values derived in these time expansions will, of course, vary with time, temperature and aging and affects the gain of the transistors, the leakages, as well as the value of the resistances and capacitances. Initially the exact values of these effects are completely unknown but, through the use of the zero and calibration functions above-described, the zero problem has been eliminated, and a crystal reference calibration has been provided for the entire flight time without having to resort to a complicated counter circuitry.

Another aspect of the precision timing section 34 is the automatic set noise control and invertor 168 which provide in conjunction with other circuit elements, a hardware hold off function. Upon firing of the laser and receipt of the reference signal REF on line 97 at the CLK input of flip-flop 158, a certain time must elapse, as determined by the time constant of resistor 164 and capacitor 166, before the D input goes high. Until that time, all noise pulses and/or early laser pulses on the clock line are ignored. The purpose for this function is that, when the laser fires, it generates unintended ground bounce and noise that may prematurely trigger the receive flip-flop 162 rather than the real laser return signal RX(OUT+). For that reason, a hold off period is provided corresponding to the minimum range of the laser range finder 1 and, as an example, considering a minimum range of about twenty yards, the holdoff time is approximately 60 nanoseconds. This is referred to herein as a "NORMAL" mode. With a lower sensitivity laser range finder 1 utilized at shorter ranges the function can be eliminated and it is clearly most useful with a high sensitivity receiver where the noise from the firing circuit determines an effective minimum range.

Transistor 174 provides an additional function and allows the microcomputer 270 to extend the hold off range by asserting the HOLD OFF signal on line 258. In this manner, the minimum range of the laser range finder 1 may be extended out to, for example, sixty or eighty yards, whatever is the desirable setting. This microcomputer 270 hold off function may be implemented by the mode switch 42 and would allow shooting through branches, twigs, precipitation or other partial obstructions. By extending the hold off range out beyond such partial obstructions, there is insufficient back scatter from the obstructions to trigger the precision timing section 34 and the measurement will be made to the desired target instead of the intervening obstructions. These selectable delays are referred to herein as "RAIN" or "IGNORE OBJECT" modes. This is accomplished by not allowing flip-flop 162 to trigger until a set timer period has elapsed. Transistor 174 is the switching device utilized to allow setting of an extension to the hold off range and gate 180 is used to determine the receive pulse width in conjunction with the discharge rate of capacitor 194. This allows the microcomputer 270, which has a built in analog-to-digital ("A/D") convertor, to determine the residual voltage on capacitor 194 and therefore derive a measure of the pulse width, (which is a measure of the return signal power) and thus use an internal lookup table to correct for that power variation and get a higher range accuracy. When the logic reset signal /RESET on line 156 is low, transistor 190 clamps capacitor 194 to the +5 volt rail. During the laser measurement routine, the transistor 190 is turned off. When a pulse subsequently arrives, that bit turns on transistor 200 and the voltage in capacitor 194 will be discharged via resistor 198 for the duration of that pulse. The charge on capacitor 194 is then digitized by the processor to determine the effect of incoming power.

Figure 14:
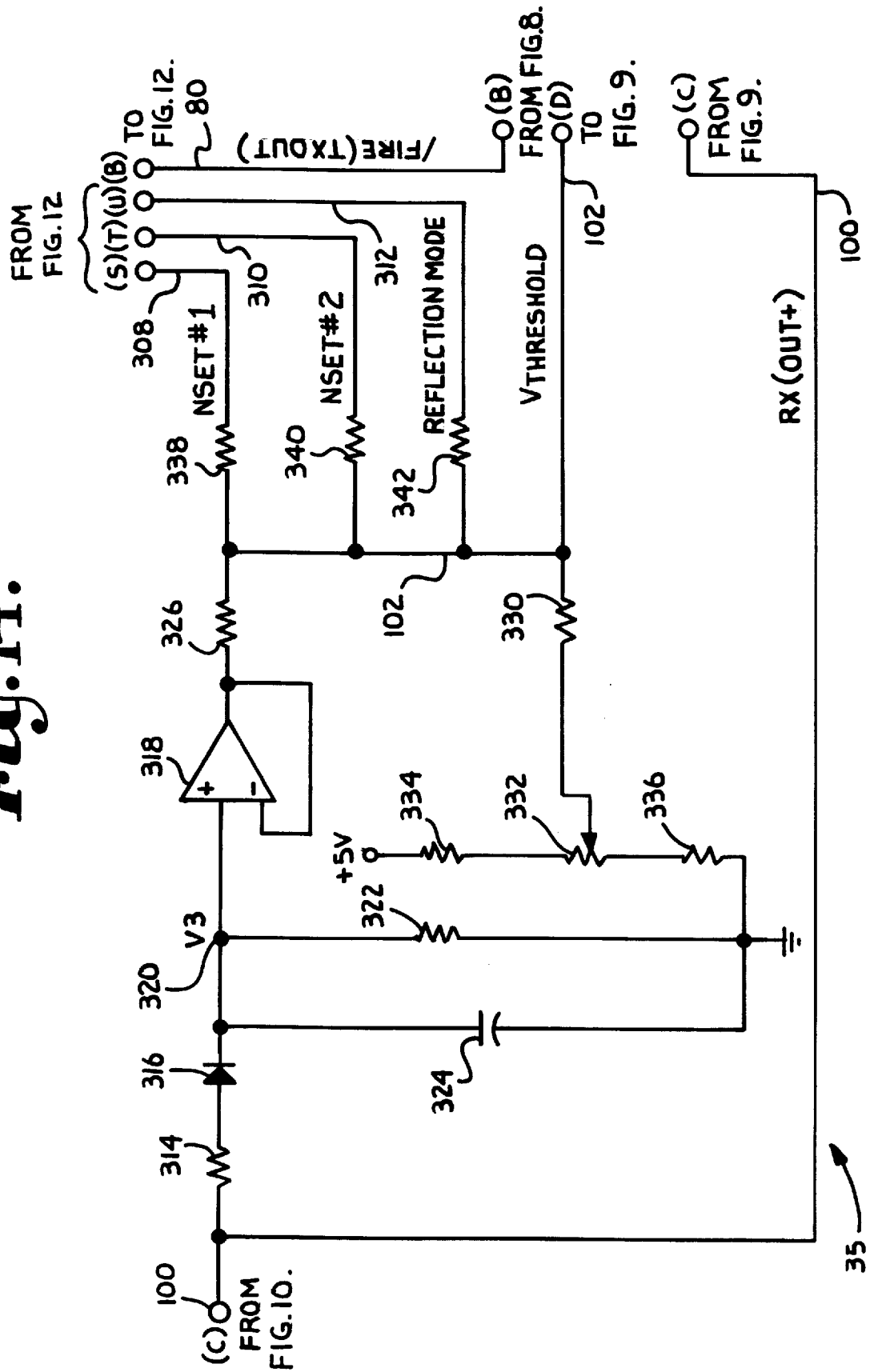
FIG. 14 is a final detailed schematic diagram of the automatic noise threshold section of the laser range finder of FIG. 6, illustrating the various components thereof as well as the signals coupling the same to the laser receive section and CPU.

With reference additionally now to FIG. 14, the automatic noise threshold section 35 of the laser range finder 1 is shown. The automatic noise threshold section 35 receives the RX(OUT+) signal from the laser receive section 32 (shown FIG. 8) on line 100 for input thereto through resistor 314. Resistor 314 is connected to the anode of diode 316 which has its cathode connected to the "+"input of operational amplifier ("Op Amp") 318 forming a V$_3$ node 320. V$_3$ node 320 is coupled to circuit ground through the parallel combination of resistor 322 and capacitor 324. The output of Op Amp 318 is coupled back to the "−" input thereof as well as to line 102 through resistor 326 for supplying the V$_{threshold}$ signal to the laser receive section 32 (shown in FIG. 8). Line 102 is connected through resistor 330 to the center tap of potentiometer 332 which has one terminal thereof connected to a source of +5 volts through resistor 334 and another terminal thereof coupled to circuit ground through resistor 336.

Line 308 and 310 from the microcomputer 270 (shown in FIG. 12) are connected through resistors 338 and 340 respectively to line 102. Additionally, line 312 from microcomputer 270 is connected to line 102 through resistor 342 as shown.

In operation, the automatic noise threshold section 35 in conjunction with the CPU section 21 (shown in FIG. 12) provides a simply implemented yet highly effective threshold adjustment to the laser receive section 32 (shown in FIG. 9). As shown in FIG. 9, the laser receiving diode 33 utilizes a high-voltage source (of about 50 volts) supplied via a noise filtering network, comprising low pass filter network 106, to bias it. The diode 33 responds with an output current proportional to the incoming laser light which is generally a short duration laser pulse producing a short current pulse which is amplified by transistors 118, 120, 122, 124, comprising the active circuit elements of a transimpedance amplifier 116. The transimpedance amplifier 116 produces an output voltage pulse proportional to the incoming laser pulse impinging on the laser receiving diode 33. The output of the transimpedance amplifier 116 is capacitively coupled to the "+" input of comparator 134, which is a high speed comparator. When the laser pulse input to the "+" input crosses a threshold determined by the voltage on the "−" threshold pin, a positive output pulse is produced.

To maximize performance, the threshold of the comparator 134 has to be set for maximum sensitivity in order to detect the weakest possible laser pulse to get the maximum performance out of the laser range finder 10. Conventional approaches include using digital controls or a potentiometer to adjust the threshold. However, these approaches have the down side that over time and temperature changes the gain of the receiver will change with the background noise generated by the background light rendering a fixed threshold as less than an ideal solution.

The automatic noise threshold section 35 of FIG. 14 discloses a circuit that automatically sets a threshold such that a constant noise pulse firing rate is output from the detector comprising resistor 314, diode 316, capacitor 324 and resistor 322. In operation, when the threshold pin of the comparator 134 (FIG. 9) is at a considerably higher voltage than the input pin, no noise pulses will appear at the output due to the inherent amplifier and optically generated noise. As the voltages on the threshold and input pins are brought closer together, noise pulses will appear at the output and, when the voltage levels are nearly coincident, a great deal of noise can be seen. In essence then, the automatic noise threshold section 35 sets the noise pulse rate at that point at which, given the right firmware algorithm, one can still acquire the target and not be blinded by the noise. The higher the noise that can be tolerated, and the closer the voltage levels at the threshold and input pins of the comparator 134, the weaker the laser pulse that can be detected. The automatic noise threshold section 35 automatically adjusts that threshold level to maintain constant noise pulse fire rate.

As shown in FIG. 14, this is accomplished by monitoring the digital logic receive signal RX(OUT+) on line 100 that goes to the receive flip-flop 162 (shown in FIG. 10). The detector monitors line 100 for the presence of noise pulses via a detector comprising the aforementioned resistor 314, diode 316, capacitor 324 and resistor 322. The value of resistor 322 is typically considerably greater than that of 314, on the order of a 150:1 ratio. The peak amplitude of the noise pulses is typically at or near the logic threshold, except for very narrow pulses where the comparator will not reach full amplitude, however, the width of these pulses is going to vary randomly because it depends on the noise signal that is being detected. Moreover, the spacing of the noise pulses will also vary at a random rate, but, for any given threshold setting, there will be a fixed average rate. The average rate is dependent on the threshold. Therefore, during the time the pulse is high, capacitor 324 charges via resistor 314 and diode 316 at a rate determined by the high on the logic pulse, resistor 314 and whatever voltage is still existing on capacitor 324.

Initially, capacitor 324 is charged as follows. Once the noise pulse terminates, the logic line goes back to zero. There is a residual voltage on capacitor 324, diode 316 will be reverse biased, and the discharge path is now via resistor 322. (As previously described, the value for resistor 322 is chosen to provide a relatively longer time constant, a factor of 150.) When another pulse comes in, capacitor 324 will charge a bit more. What will then happen is, quite rapidly, (i.e. within a few milliseconds) the voltage across capacitor 324 stabilizes at a rate that is proportional to the average firing rate. The reason for having a large ratio between resistor 314 and resistor 322 is because the noise pulses typically may average 50 nanoseconds wide, and the averaged time between them to maximize the sensitivity of the laser range finder 1 should be of the order of two microseconds or so. As an example, if a 50voltage were desired, and the high state was occurring for 50 nanoseconds while the low state average was occurring for one microsecond, a 20:1 ratio would be produced. Nevertheless, the optimum ration has been determine empirically to be about 150:1 as previously described and is related to average pulse widths (typically on the order of 30 nanoseconds in length) and pulse repetition rates (on the order of 4 microseconds) with a typical voltage level of 1.5 volts.

Op amp 318 is configured as a unity gain buffer, although it need not be unity gain, with a voltage V3 at its "+" input pin on node 320. The input is high impedance and the output is low impedance in order to drive external circuitry. The voltage that is derived at the output of the op amp 318 is then fed into a resistor network comprising resistor 338, resistor 340, resistor 342 and resistor 330. A summing node of the resistor network on line 102 goes to the threshold control to provide the signal $V_{threshold}$ to the laser receive section 32 (shown in FIG. 9). Resistor 330 is connected to the center tap of a potentiometer 332 so that the DC voltage on the other end of resistor 330 can be controlled.

In combination, the circuit comprises a feedback network such that, if there are no noise pulses, then V3 is zero and $V_{threshold}$ drops to a low value. Initially, $V_{threshold}$ will be higher, and the "−" input of comparator 134 (shown in FIG. 9) will be higher than the "+" input, forcing a logic low on the output as the starting state. As the level of V3 on node 320 falls, the voltage level on the "−" pin of comparator 134 starts approaching the level of the signal from the transimpedance amplifier 116 on the positive "+". When it approaches the noise zone, noise pulses start appearing. As soon as noise pulses start appearing, a charge appears on node 320, so V3 charges. When V1 and V3 match, the feedback point is reached and the charging stops. Basically, the voltage on the threshold is set at such a point that the noise firing rate maintains V3 at that voltage which is necessary to maintain $V_{threshold}$. Because very small changes in $V_{threshold}$ make a very large change in the noise firing rate, typically, a ten millivolt change in $V_{threshold}$ will change the voltage V3 at node 320 by about a volt. What is produced then, is a fairly high gain feedback loop, such that $V_{threshold}$ will track very closely the noise firing rate and V3 will stabilize very accurately and rapidly. This further provides the capability to adjust the noise firing rate by controlling the bias and forcing V3 to compensate. The voltage V3 at node 320 then represents the noise firing rate.

NSET1 line 308 and NSET2 line 310, are two control lines from the microcomputer 21 such that when held low or high, they adjust the noise rate to obtain the maximum range to different reflectivity targets. If both lines 308 and 310 are taken high, V3 will drop to compensate to maintain a constant threshold noise. Similarly, potentiometer 332 provides an adjustment such that the threshold point may be set together with the level of V3. Typically, the V3 point might be set equal to: 0.5, 1.0, 1.5 and 2.0 volts as desirable choices for the average noise firing rates. As such, since resistor 338 is approximately twice the value of resistor 340, four voltage combinations are obtained roughly equally spaced in voltage by half a volt. Potentiometer 332 is used to set the first voltage level to 0.5 or the last one to 2.0 while the intervals are determined by the logic control lines 308 and 310 set NSET1 and NSET2. Obviously, this approach could be extended, four combinations provides adequate resolution in the particular implementation of the laser range finder 1 described and shown. When both lines 308 and 310 are high, there is a current injected into the node comprising the $V_{threshold}$ line 102, and to compensate for that, V3 must drop, so less current flows through resistor 326 and vice versa. V3 will follow these values, depending on the permutations of logic high and low signals on the lines 308 and 310. Resistor 330 is used just to set where this whole block resides while potentiometer 332 is used to establish the initial set point. Since the noise characteristics from unit to unit will vary somewhat, potentiometer 332 enables the setting of the initial device characteristics.

Resistor 342 is of a considerably lower value than resistors 338 and 340 and its value is chosen such that, when the REFLECTION MODE signal on line 312 is asserted by being taken high, V3 will drop to zero and will stay there because it cannot go below zero. At this point, the feedback loop is saturated and no longer effective, so $V_{threshold}$ is no longer stabilized. In operation, line 312 will be pulled high by a considerable voltage, on the order of 0.4 volts, such that it completely desensitizes the laser receive section 32 so the laser range finder 1 will then only respond to a retro reflector. In this mode of operation the receiver is detuned and its non-cooperative range drops from 500 yards down to about 30 or 40 yards, such that the laser range finder 1 only latches onto a retro reflector or survey prism comprising a high grade reflector that returns the laser energy back to the source. Possible applications also include determining the distance to a particular golf hole where a laser reflector is attached to the pin and the signal might otherwise be actually returned from trees behind or in front of the green in a more sensitive mode of operation.

The essence of the automatic noise threshold section 35 is, as previously described, a feed back loop comprising the detected average noise firing rate forming a feedback loop that controls the threshold. Use of this circuit has resulted in an addition of almost 50% to the range of the laser range finder 1 compared to attempting to manually set the threshold.

By setting the noise firing rate, noise pulses are being produced deliberately, all the time and the only way to take advantage of that fact is by implementing a firmware algorithm in the microcomputer 270 that discriminates between noise pulses and laser return pulses. The algorithm operates as follows: during the laser firing process, on the first pulse that fires, the algorithm gets a laser pulse, and it places it in a stack of pulses. For example, the stack may have locations designated 0 through 9, to enable 10 pulses to be maintained in the stack. The values of the $FLIGHT_{TIME}$ are saved, corrected for power return, (the microcomputer 270 determines the power level of the return signal and corrects the flight time for power return) and placed in one of the locations in the stack. Upon receipt of the next pulse, the microcomputer 270 will then compare the next pulse with the remaining locations in the stack. Initially, most of the locations will be empty, and there will be no match. If no match is found, the microcomputer 270 puts the pulse in the stack and carries on, merely placing pulses in the stack, and then when it gets to the top, it goes back and overwrites the base, so a history of N number of pulses is developed in the stack. Any time a new pulse comes in, it compares the entire stack for a match. If N=10, it searches the preceding ten pulses for a match.

The reason for doing that is, since a high noise firing rate has been deliberately set to get maximum sensitivity, many noise pulses are going to have shown up, but the noise pulses will be of random occurrence and the chance of a precision match is very low. Because the tolerance can be set as any other firmware parameter, a default value will be typically loaded that has been determined empirically. As an example, a tolerance of a few nanoseconds may be set for a match to be assumed to be a real target and not a noise pulse. Utilizing the algorithm, the process continues, trying to lock on the target until a match is achieved. The match need only be two pulses within the preset tolerance (providing very acceptable results) or, if higher sensitivity were desired, a match of three through N may be specified, depending on the reliability needed to guarantee a real target and not a noise pulse. In an exemplary operation, the first pulse (pulse 0) could be the real target, followed by eight noise pulses, and as long as the ninth pulse is again the real target, the distance to the target can be accurately determined. The stack can be increased in size up to whatever memory limit is available in the system, depending on how far into the noise level the laser range finder 1 must work.

Having found a match, the average of the match values may then be used to compare all subsequent pulses, rather than needing to place them in a stack and only pulses that match up with that initial match average will contribute to the measurement. If a certain number of pulses elapse before another matching pulse is received, it may be assumed that an accidental lock-on to noise has been achieved and the process restarts. By adjusting the various parameters, a trade off can be made between the time it takes to get a measurement to how far into the noise the laser range finder 1 must work. Because the noise rate can set to whatever is desired by means of the automatic noise threshold section 35, it is possible to optimize the algorithm to provide the optimum acquisition characteristics against time and against range.

The higher the value of V3, the more noise is coming out of the receiver, and the more sensitive the laser receive section 32 is running. The probability of a noise pulse showing up is proportional to the flight time, so given a very "black" target, the maximum range will be less, but the maximum flight time is also less, so a higher noise rate can be tolerated. Therefore, running at a higher gain will provide the best range to a black target. On the other hand, if the target is very reflective, a high gain is not required, so the noise rate can be lowered, which then provides the same probability of a noise pulse appearing over a longer flight range, and therefore a quick acquisition on a bright white target can be achieved. Thus, by depressing the mode switch 126, different modes of operation of the laser range finder 1 can be selected. As an example, one mode might be utilized to find the range to reflective road signs out to a distance of 1000 yards or more. Alternatively, aiming the laser range finder 1 at something like wet black tree bark, might reduce the maximum range to only 350–400 yards and so a different operational mode might be selected which would otherwise require a relatively long time to hit the road sign, if ever, because there would always be a noise pulse in the way. The mode switch 126 allows the setting of these variables to maximize the range of the laser range finder 10, depending on the target quality and a visual indication of the target quality selected may be provided to the operator on the in-sight, LCD display 23 wherein the first mode would correspond to the brightest target or most reflective target, and the Nth mode would correspond to the least reflective target.

3. Operation

Referring to the drawings, and more particularly to FIGS. 1–5, a user of the range finder 1, such as the hunter 2, aims the range finder 1 at a target, such as the sheep 3. As shown in FIG. 3, the sheep 3 is optically magnified in the substantially rectangular TV view 6 within the circular field of view 5 of the range finder 1. Again, for purposes of illustration only, in FIGS. 3–5 the sheep 3 is shown at a larger size than the nominal 4×magnification of the range finder 1 would produce at the described range.

Once the aiming reticle 7 is positioned on the target 3, as illustrated in FIG. 3, the hunter 2 engages the fire switch 31, causing the microcontroller 21 to emit a series of laser pulses, as described above. If sufficient pulses are received to perform a reliable range calculation, the microcontroller 21 locks onto a calculated range and displays the calculated range on the seven segment range display 20. The hunter then can use the displayed range for configuring his shot trajectory to the target 3.

Figure 2:
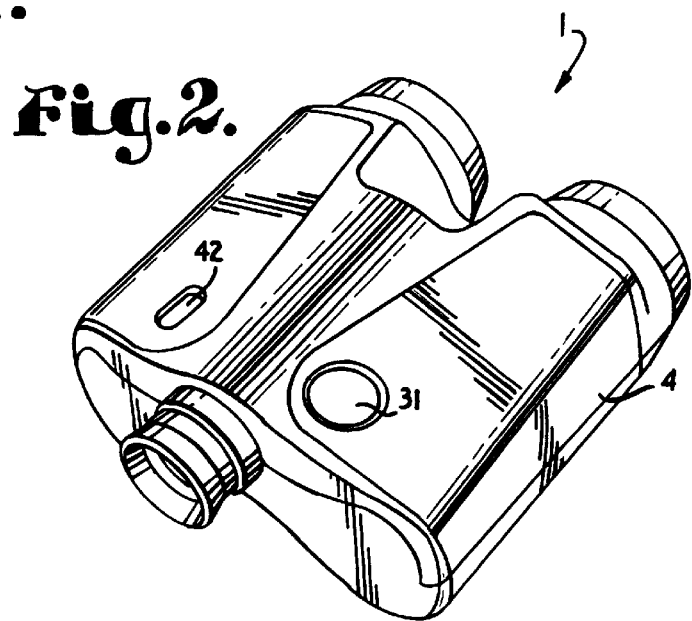
FIG. 2 is an enlarged, perspective view of the laser range finder of FIG. 1.

If, however, insufficient reflected pulses are received to perform a reliable range calculation, the microcontroller 21 nonetheless calculates a ratio of transmitted versus received pulses for display on the bar graph 13. As shown in FIG. 2, this ratio may only be 10% or so, with 1 out of 10 bars 14 displayed on the bar graph 13. The hunter 2 thus knows that the reflective capabilities of his target 3, i.e. the target quality, are insufficient to provide a reliable range calculation. For example, if the laser pulses are aimed at a portion of a torso 61 of the sheep 3, as shown in FIG. 3, the fur may not be reflective enough to allow the range finder 1 to lock onto a range. The hunter 2 then can adjust the aim of the range finder 1 to attempt to find a portion of the target 3 or the target surroundings which is of a higher target quality. In the case of the sheep 3, perhaps the horns 62 or the eye 63 will provide the requisite target quality. Each time the hunter 2 adjusts the aim of the range finder 1, as shown in FIGS. 3, 4 and 5, he reengages the fire switch 31 to trigger a new range finding attempt. It may take 2 or 3 iterations, as represented by FIGS. 3–5, for a successful range finding calculation to be performed. In FIG. 4, for example, the horns 62 may be of a better target value than the torso 61, as indicated by 4 of the bars 14 being displayed on the bar graph 13, with the received pulses being sufficient to perform a range calculation which is reliable to within ±3 yards, here indicated as 282 yards. Finally, in FIG. 5, the sheep's eye 63 is so reflective that a near 100% return of pulses is achieved, allowing precision range calculation to within ±1 yard, as represented by the final range figure of 280 yards, as well as the display of nine out of the ten possible bars 14 in the target quality bar graph 13 and the highlighting of the PRECISION indicator 19.

Thus, by using the target quality bar graph 13 as an indicator, the hunter 2 is able to secure a precise range indication where, without the target quality bar graph 13, a reliable range indication might be impossible.

Figure 7:
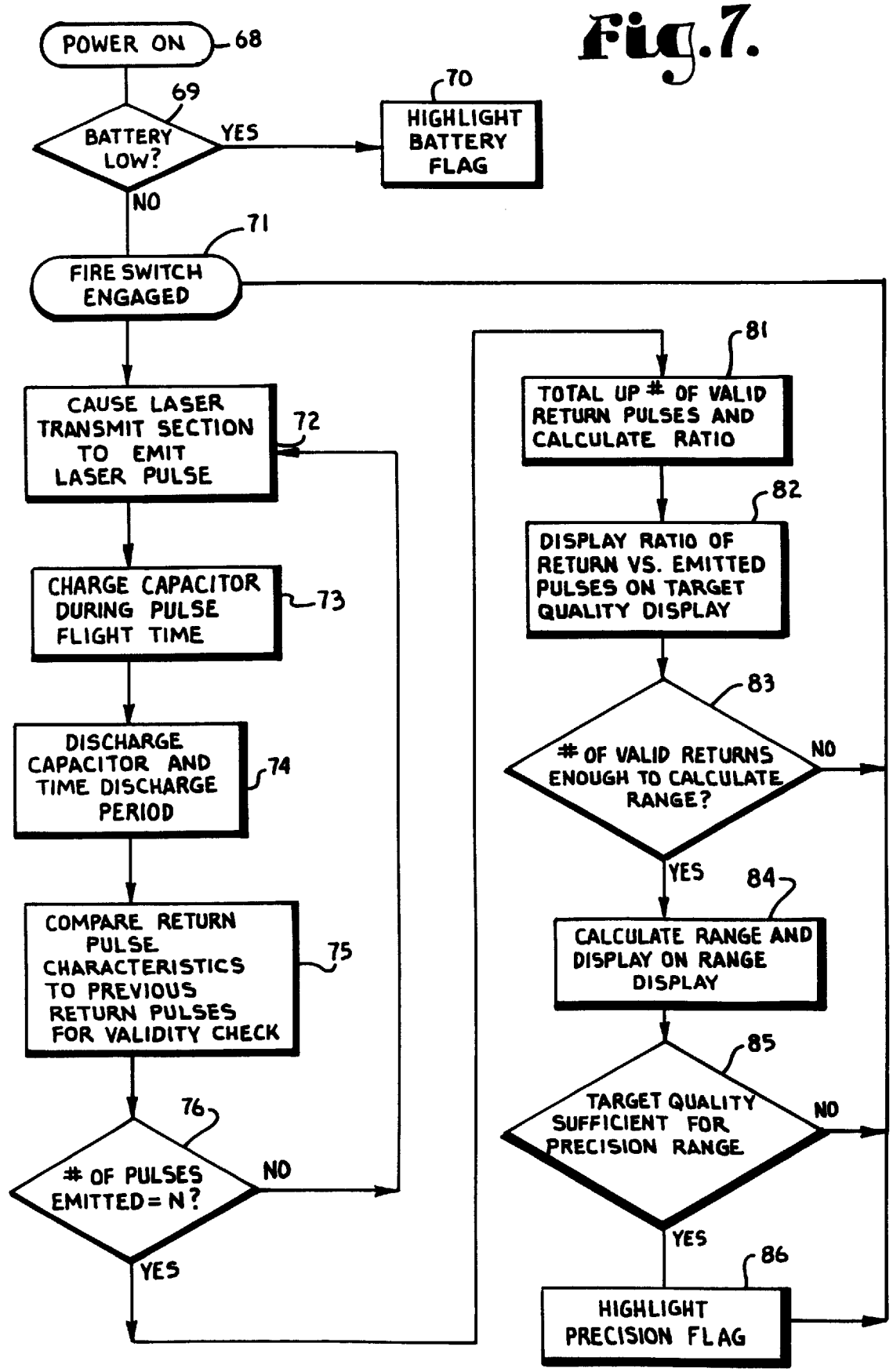
FIG. 7 is a logical flow chart illustrating a programmed algorithm for the microcontroller of FIG. 6.

Referring to FIG. 7, a flow chart is indicative of a simplified logical algorithm performed by the programmable microcontroller 21. At block 68, the range finder 1 is powered up and, at decision block 69, the microcontroller checks the condition of battery 27. In the case of a low battery condition, the microcontroller 21 highlights the BATT flag 16b in the top display portion 11 as a low battery indicator. At block 71, the microcontroller 21 monitors the fire switch 31 for an engagement signal. When a fire signal is received, the microcontroller 21, at block 72, enables the laser transmit section 22 to emit a series of laser pulses toward the selected target with a footprint approximately equal to the size of the reticle 7 in the range finder TV view 6. For each pulse sent, a capacitor (not shown) is charged in the precision timing section 34, as indicated at block 73. After a reflected pulse is detected by the laser receive section 32, the charging of the capacitor in the timing section 34 is halted and, shortly thereafter, discharging of the capacitor is started and timed by the microcontroller 21, as indicated at block 74. At block 75, each detected return pulse is verified as determined by a comparison of the pulse characteristics with other pulses already stored in the pulse stack memory 43, as described briefly earlier and in detail in the Laser Tech application Ser, No. 08/375,945.

At decision block 76, the microcontroller 21 counts the number of emitted pulses and repeats the emission and detection process of blocks 72–76 until N number of pulses have been emitted. At blocks 81 and 82, a ratio of valid returned laser pulses vs. emitted pulses is calculated and displayed on the bar graph 13. At decision block 83, the microcontroller 21 determines if sufficient valid return pulses have been received and timed to perform a reliable range calculation. If the answer is NO, the microcontroller 21 times out and awaits a further trigger enable signal. If the answer is yes, at block 84, the microcontroller 21 performs the range calculation, locks in a calculated range and displays the calculated range on the seven segment display 20. At decision block 85, the microcontroller 21 determines whether the number and quality of returned pulses is sufficient for a precision ranging calculation with accuracy to within ±1 yard, and, if the answer is YES, at block 86, the PRECISION flag 18 is highlighted.

While the target quality bar graph 13 has been described and illustrated as being used with a multiple pulse averaging range finder 1, the concept could also be used effectively with a single pulse system with the bar graph indicating the amplitude and/or duration of a detected returned pulse. It should be emphasized again that the illustrated use of the range finder 1 by a hunter is but one of a wide variety of potential uses for the range finder 1, as previously described.

It is to be understood that while certain forms of the present invention have been illustrated and described herein, it is not to be limited to the specific forms or arrangement of parts described and shown.

What is claimed and desired to be secured by Letters Patent is as follows:

1. In a laser range finder, said range finder including a laser transmit section operably emitting laser pulses directed toward a target, a laser receive section receiving laser pulses reflected from said target, a timer timing a flight time for each said pulse from a time of emission of said pulse to a time of reception of said reflected laser pulse, a calculator programmed to operably calculate a range to said target based upon said pulse flight times, the improvement comprising:
    a) said calculator also programmed to calculate the reflective quality of said target based upon the number of detected reflected laser pulses and/or the ratio of detected reflected laser pulses versus the number of emitted laser pulses; and
    b) a target quality display cooperating with said calculator to display said reflective quality of said target.

2. The laser range finder of claim 1, wherein said target quality display comprises a bar graph.

3. The laser range finder of claim 1, wherein said target quality display comprises a precision flag that, when triggered by a value for the reflective quality of the target visually indicates that a precision range calculation is being displayed.

4. The laser range finder of claim 1, and further comprising indicia selectively indicating a low battery condition.

5. The laser range finder of claim 1, and further comprising a user viewer comprising:
    a) an in-sight circular field of view including:
        i. a first display portion comprising a magnified TV view of the target; and
        ii. a second display portion comprising said target quality display.

6. The laser range finder of claim 5, wherein said magnified TV view includes a targeting reticle which approximates the footprint of said laser pulses emitted from said range finder.

7. The laser range finder of claim 5, wherein said circular field of view further includes a third display portion comprising a target range display.

8. The laser range finder of claim 7, wherein said third display portion also comprises a precision flag for indicating that a precision range calculation is being displayed.

9. The laser range finder of claim 7, and further comprising selection mechanism operably adapted to select a minimum ranging mode.

10. The laser range finder of claim 9, wherein said third portion of said circular field of view also includes a minimum ranging mode display.

11. In a laser range finder, said range finder including a laser transmit section operably emitting laser pulses directed toward a target, a laser receive section receiving laser pulses reflected from said target, a timer timing a flight time for each said pulse from a time of emission of said pulse to a time of reception of said reflected pulse, a calculator programmed to operably calculate a range to said target based upon said pulse flight times, the improvement comprising:

a) said calculator also programmed to calculate the reflective quality of said target based upon the number of detected reflected laser pulses and/or the ratio of detected reflected laser pulses versus the number of emitted laser pulses;

b) an in-sight field of view including:
  i. a first display portion comprising a magnified TV view of the target said magnified TV view including a targeting reticle which approximates the footprint of said laser pulses emitted from said range finder; and
  ii. a second display portion comprising target quality bar graph display that displays said reflective quality of said target.

12. The laser range finder of claim 11, and further comprising indicia selectively indicating a low battery condition.

13. The laser range finder of claim 11, wherein said in-sight field of view further includes a third display portion comprising a target range display.

14. The laser range finder of claim 13, wherein said third display portion also comprises a precision flag for indicating that a precision range calculation is being displayed.

15. The laser range finder of claim 13, and further comprising selection means for minimum ranging mode.

16. The laser range finder of claim 15, wherein said third display portion also includes a minimum ranging mode display.

17. In a laser range finder, said range finder including a laser transmit section operably emitting laser pulses directed toward a target, a laser receive section receiving laser pulses reflected from said target, a timer timing a flight time for each said pulse from a time of emission of said pulse to a time of reception of said reflected pulse, a calculator programmed to calculate a range to said target based upon said pulse flight times, the improvement comprising:

a) said calculator also programmed to calculate the reflective quality of said target based upon the number of detected reflected laser pulses and/or the ratio of detected reflected laser pulses versus the number of emitted laser pulses; and b) an in-sight field of view including:
  i. a first portion comprising a magnified TV view of the target said magnified TV view including a targeting reticle which approximates the footprint of said laser pulses emitted from said range finder;
  ii. a second portion comprising a target quality bar graph display displaying said reflective quality of said target; and
  iii. a third portion comprising a target range display.

18. The laser range finder of claim 17, and further comprising indicia selectively indicating a low battery condition.

19. The laser range finder of claim 17, wherein said third display portion also comprises a precision flag for indicating that a precision range calculation is being displayed.

20. The laser range finder of claim 17, and further comprising selection means for selecting a minimum ranging mode.

21. The laser range finder of claim 20, wherein said third display portion also includes a minimum ranging mode display.

22. In a laser range finder, said range finder including a laser transmit section operably emitting laser pulses directed toward a target, a laser receive section receiving laser pulses reflected from said target, a timer timing a flight time for each said pulse from a time of emission of said pulse to a time of reception of said reflected pulse, a calculator programmed to calculate a range to said target based upon said pulse flight times, the improvement comprising:

a) said calculator also programmed to calculate the reflective quality of said target based upon the number of detected reflected laser pulses and/or the ratio of detected reflected laser pulses versus the number of emitted laser pulses;

b) a target quality display cooperating with said calculator to display said reflective quality of said target; and wherein c) said target quality display comprises a bar graph.

23. In a laser range finder, said range finder including a laser transmit section operably emitting laser pulses directed toward a target, a laser receive section receiving laser pulses reflected from said target, a timer timing a flight time for each said pulse from a time of emission of said pulse to a time of reception of said reflected pulse, a calculator programmed to calculate a range to said target based upon said pulse flight times, the improvement comprising:

a) said calculator having a second part operably evaluating the reflective quality of said target based upon the number of detected reflected laser pulses and/or the ratio of detected reflected laser pulses versus the number of emitted laser pulses;

b) a target quality display cooperating with said calculator to display said reflective quality of said target; and wherein c) said target quality display comprises a precision flag that, when triggered by a value for the reflective quality of the target visually indicates that a precision range calculation is being displayed.

24. In a laser range finder, said range finder including a laser transmit section operably emitting laser pulses directed toward a target, a laser receive section receiving laser pulses reflected from said target, a timer timing a flight time for each said pulse from a time of emission of said pulse to a time of reception of said reflected pulse, a calculator programmed to operably calculate a range to said target based upon said pulse flight times, and a display with a range display portion displaying the calculated range, the improvement comprising:

a. a selector which allows a user to select a single ranging sensitivity mode from a plurality of selectable ranging sensitivity modes, at least two of said plurality of selectable ranging sensitivity modes having different hold off times representing different respective times during which received pulses will not be used for ranging purposes and thus corresponding to to different minimum ranging distances; and b. said display includes a ranging sensitivity mode display portion which displays the selected ranging sensitivity mode.

25. The laser range finder of claim 24, wherein said plurality of ranging sensitivity modes includes a "NORMAL" mode which is a default minimum target ranging distance.

26. The laser range finder of claim 25, wherein said default minimum target ranging distance in said "NORMAL" mode is approximately 15 yards.

27. The laser range finder of claim 25, wherein said NORMAL mode is indicated on said ranging sensitivity mode display portion by the absence of any highlighted words.

28. The laser range finder of claim 24, wherein said plurality of ranging sensitivity modes includes a "RAIN"

mode which desensitizes the range finder to eliminate ranging due to signal returns from rain drops by extending the minimum target ranging distance past the effective reflective distance of rain drops occurring between the range finder and the target.

29. The laser range finder of claim 28, wherein said minimum target ranging distance in said "RAIN" mode is greater than 15 yards and less than 100 yards.

30. The laser range finder of claim 28, wherein said RAIN mode is indicated on said ranging sensitivity mode display portion by highlighting the word "RAIN".

31. The laser range finder of claim 24, wherein said plurality of ranging sensitivity modes includes an "IGNORE OBJECT" mode which extends the minimum target ranging distance past the default minimum target ranging distance to ignore pulse reflections from an object positioned between the range finder and the target.

32. The laser range finder of claim 31, wherein said minimum target ranging distance in said "IGNORE OBJECT" mode is greater than 15 yards and less than 200 yards.

33. The laser range finder of claim 31, wherein said "IGNORE OBJECT" mode is indicated on said ranging sensitivity mode display portion by highlighting a numerical minimum target ranging distance on the display portion.

34. The laser range finder of claim 24, wherein said plurality of ranging sensitivity modes includes a "REFLECTION" mode which desensitizes the laser range finder such that a high grade reflector target is required for accurate ranging.

35. The laser range finder of claim 34, wherein said "REFLECTION" mode is indicated on said ranging sensitivity mode display portion by highlighting the word "REFLECTION" or a portion thereof on the display portion.

36. The laser range finder of claim 24, and wherein said display further includes:
  a. an in-sight circular field of view including:
    i. a view portion comprising a magnified TV view of the target; and
    ii. said ranging sensitivity mode display portion.

37. The laser range finder of claim 36, wherein said magnified TV view includes a targeting reticle which approximates the footprint of said laser pulses emitted from said range finder.

38. The laser range finder of claim 36, wherein said circular field of view further includes said target range display portion.

39. The laser range finder of claim 36, wherein said circular field of view further includes a PRECISION flag for indicating that a precision range calculation is being displayed.

40. In a laser range finder, said range finder including a laser transmit section operably emitting laser pulses directed toward a target, a laser receive section receiving laser pulses reflected from said target, a timer timing a flight time for each said pulse from a time of emission of said pulse to a time of reception of said reflected pulse, a calculator programmed to operably calculate a range to said target based upon said pulse flight times, and a display with a range display portion displaying the calculated range, the improvement comprising:
  a. a selector which allows a user to select either a "NORMAL" sensitivity mode with a minimum hold off time during which received pulses will not be used for ranging purposes, representing a normal minimum ranging distance or a "RAIN" ranging sensitivity mode which desensitizes the range finder by providing a longer hold off time during which received pulses will not be used for ranging purposes, representing a longer than normal minimum ranging distance to ignore signal returns from rain drops; and b. said display includes a "RAIN" ranging sensitivity mode display portion which displays the status of the RAIN ranging sensitivity mode.

41. The laser range finder of claim 40, wherein said "RAIN" ranging sensitivity mode extends the minimum target ranging distance past the effective reflective distance of rain drops occurring between the range finder and the target.

42. The laser range finder of claim 41, wherein said minimum target ranging distance in said "RAIN" mode is greater than 15 yards and less than 100 yards.

43. In a laser range finder, said range finder including a laser transmit section operably emitting laser pulses directed toward a target, a laser receive section receiving laser pulses reflected from said target, a timer timing a flight time for each said pulse from a time of emission of said pulse to a time of reception of said reflected pulse, a calculator programmed to operably calculate a range to said target based upon said pulse flight times, and a display with a range display portion displaying the calculated range, the improvement comprising:
  a. a selector which allows a user to select either a "NORMAL" sensitivity mode with a minimum hold off time during which received pulses will not be used for ranging purposes, representing a normal minimum ranging distance or an "IGNORE OBJECT" ranging sensitivity mode which desensitizes the range finder by providing a longer hold off time during which received pulses will not be used for ranging purposes, representing a longer than normal minimum ranging distance which causes the range finder to ignore returns from an object positioned between the range finder and the target; and
  b. said display includes an "IGNORE OBJECT" ranging sensitivity mode display portion which displays the status of the "IGNORE OBJECT" ranging sensitivity mode.

44. The laser range finder of claim 43, wherein said "IGNORE OBJECT" ranging sensitivity mode extends the minimum target ranging distance past the distance of the object positioned between the range finder and the target.

45. The laser range finder of claim 44, wherein said minimum target ranging distance in said "IGNORE OBJECT" mode is greater than 15 yards and less than 200 yards.

46. The laser range finder of claim 43, wherein said "IGNORE OBJECT" mode is indicated on said ranging sensitivity mode display portion by highlighting a numerical minimum target ranging distance on the ranging sensitivity display portion.

47. In a laser range finder, said range finder including a laser transmit section operably emitting laser pulses directed toward a target, a laser receive section receiving laser pulses reflected from said target, a timer timing a flight time for each said pulse from a time of emission of said pulse to a time of reception of said reflected pulse, a calculator programmed to operably calculate a range to said target based upon said pulse flight times, and a display with a range display portion displaying the calculated range, the improvement comprising:

a. a selector which allows a user to select either a "NORMAL" sensitivity mode during which ordinary targets will be detected for ranging or a "REFLECTION" ranging sensitivity mode which desensitizes the laser range finder such that a high grade reflector target is required for accurate ranging; and b. said display includes a "REFLECTION" ranging sensitivity mode display portion which displays the status of the "REFLECTION" ranging sensitivity mode.

48. The laser range finder of claim 47, wherein said "REFLECTION" ranging sensitivity mode is indicated on said ranging sensitivity mode display portion by highlighting the word "REFLECTION" or a portion thereof on the sensitivity mode display portion.

* * * * *